United States Patent
Mizuno et al.

(10) Patent No.: US 6,249,550 B1
(45) Date of Patent: Jun. 19, 2001

(54) MOTION VECTOR ESTIMATING APPARATUS WITH HIGH SPEED AND METHOD OF ESTIMATING MOTION VECTOR

(75) Inventors: Masayuki Mizuno; Yasushi Ooi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/931,650

(22) Filed: Sep. 16, 1997

(30) Foreign Application Priority Data

Sep. 20, 1996 (JP) .................................. 8-271756

(51) Int. Cl.[7] .............................. H04N 7/12; H04N 11/02; H04N 11/04
(52) U.S. Cl. ...................................... 375/240.24; 348/699
(58) Field of Search .................................. 348/699, 700, 348/400, 401, 402, 407, 411–413, 415, 416, 420; 452/232, 236, 238; 375/240; H04N 7/12, 11/02, 11/04

(56) References Cited

U.S. PATENT DOCUMENTS

| | | | |
|---|---|---|---|
| 4,897,720 | * 1/1990 | Wu et al. | 358/136 |
| 5,047,850 | 9/1991 | Ishii et al. | 358/105 |
| 5,177,608 | 1/1993 | Ohki et al. | 358/136 |
| 5,400,087 | 3/1995 | Uramoto et al. | 348/699 |
| 5,557,341 | * 9/1996 | Weiss et al. | 348/699 |
| 5,659,364 | 8/1997 | Aoki et al. | 348/416 |
| 5,661,524 | * 8/1997 | Murdock et al. | 348/416 |
| 5,682,209 | * 10/1997 | Borgwardt | 348/699 |
| 5,699,129 | * 12/1997 | Tayama | 348/699 |
| 5,793,443 | 8/1998 | Aoki et al. | 348/699 |
| 5,812,199 | * 9/1998 | Lu et al. | 348/416 |
| 5,822,007 | * 10/1998 | Knee et al. | 348/416 |
| 5,949,484 | * 9/1999 | Nakaya et al. | 348/384 |
| 5,973,742 | * 10/1999 | Gardyne et al. | 348/416 |

FOREIGN PATENT DOCUMENTS

| | | |
|---|---|---|
| 61-201583 | 9/1986 | (JP) . |
| 2-20988 | 1/1990 | (JP) . |
| 2-62179 | 3/1990 | (JP) . |
| 2-226888 | 9/1990 | (JP) . |
| 2-231886 | 9/1990 | (JP) . |
| 2-241187 | 9/1990 | (JP) . |
| 4-127690 | 4/1992 | (JP) . |
| 4-138790 | 5/1992 | (JP) . |
| 4-150284 | 5/1992 | (JP) . |
| 4-189093 | 7/1992 | (JP) . |
| 5-328333 | 9/1993 | (JP) . |
| 6-113290 | 4/1994 | (JP) . |
| 7-184210 | 7/1995 | (JP) . |
| 7-203457 | 8/1995 | (JP) . |
| 7-250328 | 9/1995 | (JP) . |
| 9-23422 | 1/1997 | (JP) . |

OTHER PUBLICATIONS

Osako et al., "A Dynamic Computation Resource Scalable Algorithm for Software Video COCEC,".

Electronics, Information & Telecommunication Society Thesis publication D–II, vol. J80–D–II, No. 2, pp. 444–458 (Jul. 8, 1996).

* cited by examiner

*Primary Examiner*—Howard Britton
*Assistant Examiner*—Nhon T Diep
(74) *Attorney, Agent, or Firm*—Foley & Lardner

(57) ABSTRACT

In a motion vector estimating apparatus, a current picture storage unit stores image data of a current picture, and a reference picture storage unit stores image data of a reference picture. A search window determining unit determines estimation history from previously estimated motion vectors, and determines a search window based on the estimation history. At least one of a shape, size and position of the search window is determined based on the estimation history. The search window is composed of rectangular reference regions. A block matching circuit for performing a block matching process to a current block and each of reference blocks of the search window to determine a motion vector. The search window may be limited in units of pixels, or a load of the apparatus, a power supply voltage or a temperature of the block matching circuit.

4 Claims, 19 Drawing Sheets

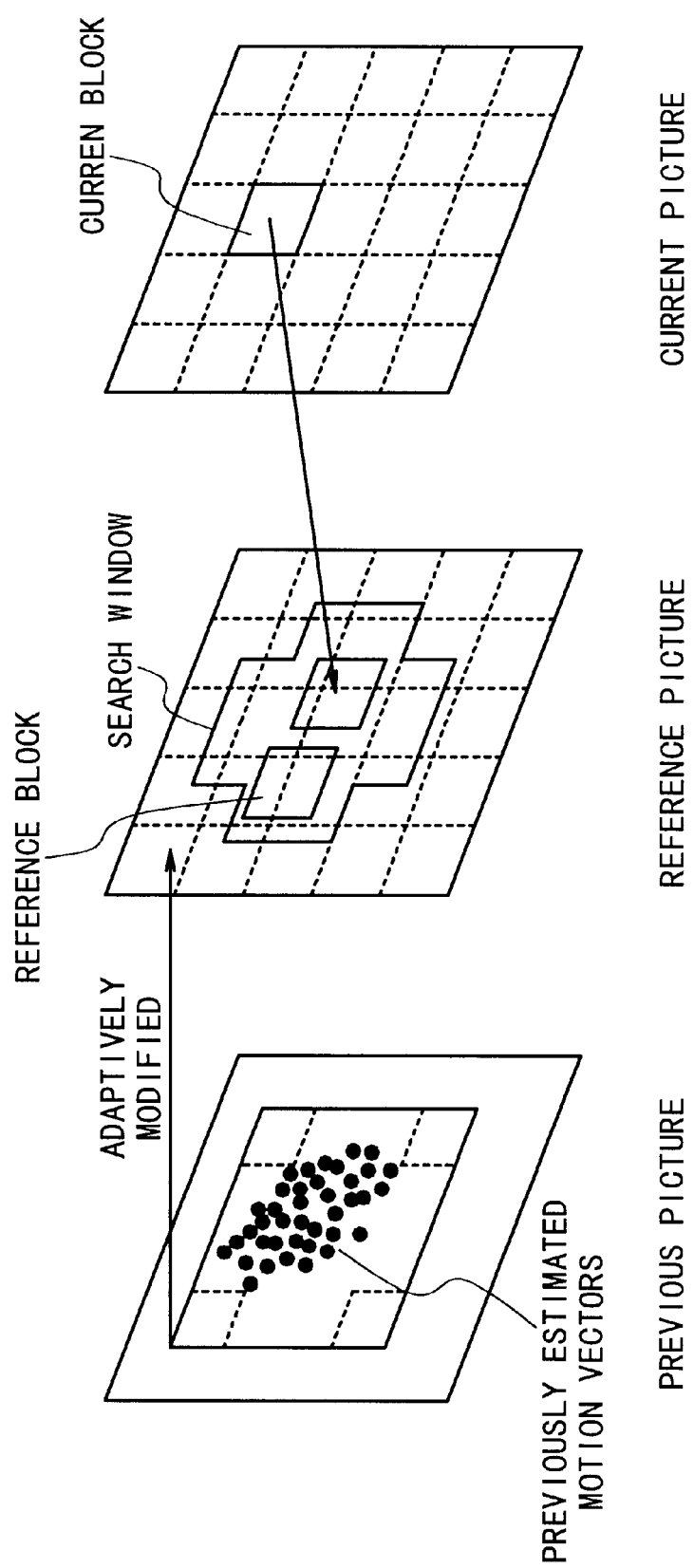

SIGNAL FIOW BETWEEN PEs

MOTION VECTOR ESTIMATING APPARATUS WITH HIGH SPEED AND METHOD OF ESTIMATING MOTION VECTOR

BACKGROUND OF THE INVENTION

1. Field of the Invention

The present invention is related to an apparatus and a method for estimating a motion vector utilized to compensate for motion of an image in a prediction coding process of a moving picture.

2. Description of the Related Art

In a conventional method and apparatus for estimating a motion vector estimating method, a current picture to which a prediction coding process is performed is divided into a plurality of blocks, for example, to have 16 pixels in a horizontal direction and 16 pixels in a vertical direction. These blocks are referred to as current blocks. A search region is predetermined in a reference picture for each of the above-described current blocks to have as a center of the search region the positions corresponding to the horizontal position and the vertical position of a pixel position of each current block. The predetermined search region in the reference picture is referred to as a search window. A block matching process is carried out between a specific one of the current blocks and the search window corresponding to the specific current block to estimate a position on which a predetermined evaluation function has the minimum value for obtaining a motion vector. The conventional motion vector estimating apparatus is directed to a purpose that the motion vector can be more correctly obtained.

A first conventional example of a motion vector estimating apparatus is disclosed in, for example, Japanese Laid Open Patent Application (JP-A-Showa 61-201583). In the reference, a limit value is provided to limit a reference region used to search the motion vector in accordance with a change amount of a motion vector detected in a previous frame to a current frame. When the motion vector change amount exceeds the limit value, this limit value is outputted.

Also, a second conventional example of the motion vector estimating apparatus is proposed in Japanese Laid Open Patent Application (JP-A-Heisei 5-328333), in which several search windows or regions for a motion vector are prepared to be different from each other in position. One of the several reference windows or regions is selected in accordance with the change amounts of the motion vectors detected in a previous frame to the current frame.

Further, a third conventional example of the motion vector estimating apparatus is proposed in Japanese Laid Open Patent Application (JP-A-Heisei 7-203457), in which an accumulating process of absolute values of differences is executed in a parallel manner in the block matching process. As a result, the capacity of a buffer for signals used in the accumulation is reduced so as to increase the processing speed.

Furthermore, a fourth conventional example of the motion vector estimating apparatus is proposed in Japanese Laid Open Patent Application (JP-A-Heisei 7-250328), in which motion vectors used to compensate for the moving image prediction are estimated in accordance with a plurality of prediction modes with a small hardware amount.

There are the following problems in the above-described conventional examples of the motion vector estimating techniques.

(1) The first problem is in the following point. That is, power consumption cannot be reduced in the first conventional example of the motion vector estimating apparatus in which the limit value is provided to limit the search region for the motion vector. This is because in the motion vector estimating apparatus described in Japanese Laid Open Patent Application (JP-A-Showa 61-201583), the limit value is only introduced to the reference region. The calculation time and the calculation amount for the block matching process to be executed cannot be reduced in actual. In other words, since the calculation time and the calculation amount cannot be reduced, the power consumption of the motion vector estimating apparatus cannot be reduced.

In the block matching process as described in, for instance, Japanese Laid Open Patent Application (JP-A-Heisei 7-203457) and Japanese Laid Open Patent Application (JP-A-Heisei 7-250328), the operation time is reduced by employing parallel processing. However, the reason why the operation time cannot be reduced is that if the limit value is provided as in the motion vector estimating apparatus described in Japanese Laid Open Patent Application (JP-A-Showa 61-201583), the parallel degree of the above-described parallel processing decreases. As a result, the operation time cannot be reduced.

(2) The second problem is in that the correct motion vector cannot be obtained in the conventional motion vector estimating apparatus as proposed in Japanese Laid Open Patent Application (JP-A-Heisei 5-328333), in which the several reference regions for the motion vector are prepared. This is because in the method for selecting the optimum reference region from the prepared reference regions, when pictures are such complex that more than one object move, the object moving direction cannot be exclusively determined. As a result, the optimum reference region cannot be selected from the prepared several reference regions.

Also, in the above-described motion vector estimating apparatus described in Japanese Laid Open Patent Application (JP-A-Heisei 5-328333), if the size and/or shape of the reference region cannot be previously determined, then the parallel degree of the apparatus for executing the block matching process would be lowered. As a consequence, since the shape of the reference region is limited and thus the proper reference region cannot be utilized, the correct motion vector cannot be obtained.

(3) The third problem is in that in the motion vector estimating apparatus proposed in Japanese Laid Open Patent Application (JP-A-Heisei 7-203457), the difference absolute value accumulating process is carried out in the parallel manner using the small buffer for signals for the calculation. However, in the motion vector estimating apparatus, the hardware amount of the block matching circuit for executing the difference absolute value accumulating process in the parallel manner increases so that the chip area for the block matching circuit is increased as well as the power consumption is increased. This is because in the motion vector estimating apparatus as described in Japanese Laid Open Patent Application (JP-A-Heisei 7-203457) and Japanese Laid Open Paten Application (JP-A-Heisei 7-250328), a large amount of wiring lines must be provided for a processing element as the minimum unit of the block matching circuit. Thus, the valid data can be continuously entered into the respective processing elements such that the parallel degree is increased. As a consequence, a chip area required for the wiring lines increases considerably.

Also, in the above-explained motion vector estimating apparatus described in Japanese Laid Open Patent Application (JP-A-Heisei 7-203457) and Japanese Laid Open Patent Application (JP-A-Heisei 7-250328), there is another problem. That is, the minimum value determining unit determines the minimum value of a summation of absolute values of differences accumulated values in the respective processing elements, and the chip area required for wiring lines is considerably increased, because a total number of wiring lines is very large which are used to be connected from the minimum value determining unit.

(4) The fourth problem is in that if the size and/or shape of the reference region is allowed to be varied in the motion vector estimating apparatus in which the difference absolute value accumulating process is executed in the parallel manner, the hardware amount of the block matching circuit for executing the difference absolute value accumulation process in the parallel manner is increased. As a result, the chip area increases and also the power consumption increases. Also, at this time, the parallel degree is reduced. This is because the large amount of wiring lines must be provided to continuously enter the valid data into the processing elements as the minimum unit for constituting the block matching circuit.

Also, it is because the data entering sequence of the processing element is greatly changed, depending upon the sizes and the shapes of the reference regions. As a result, the process for reading out the reference data from a storage unit becomes complex, so that the chip area increases and the power consumption increases.

(5) The fifth problem is in that the chip area of the block matching circuit increases in the motion vector estimating apparatus in which the motion vector is estimated in a plurality of prediction modes. This is because a large number of wiring lines is required to connect the minimum value determining unit for determining the minimum value of the difference absolute value accumulated values to the respective processing elements in the motion vector estimating apparatus described in Japanese Laid Open Patent Application (JP-A-Heisei 7-250328). As a result, the chip area required for the wiring lines is considerably increases.

Also, the stage number of FIFOs (first-in first-out) required for the block matching circuit is increased.

SUMMARY OF THE INVENTION

As a consequence, the present invention has been made to solve the above-described problems. Therefore, an object of the present invention is to provide a motion vector estimating method and a motion vector estimating apparatus which can estimate a motion vector in high precision with low power consumption and a saved chip area.

Another object of the present invention is to provide a motion vector estimating method and a motion vector estimating apparatus, in which when a parallel processing is applied to a block matching process, the parallel degree thereof is not reduced.

Still another object of the present invention is to provide a motion vector estimating method and a motion vector estimating apparatus, in which motion vectors of a plurality of prediction modes can be estimated while saving the chip area of a block matching circuit.

Yet still another object of the present invention is provide a motion vector estimating apparatus, which can be realized with the saved chip area of a block matching circuit regardless of the dimension and shape of a reference region.

In order to achieve an aspect of the present invention, a motion vector estimating apparatus includes a current picture storage unit which stores image data of a current picture, a reference picture storage unit which stores image data of a reference picture, a search window determining unit which determines estimation history from previously estimated motion vectors, and determines a search window based on the estimation history, wherein the search window is composed of rectangular reference regions, a block matching circuit for performing a block matching process to a current block and each of reference blocks of the search window to determine a motion vector, and a control circuit which reads out the image data of the current block from the current picture storage unit to supply the block matching circuit, which reads out the image data of each of the reference blocks of the search window from the reference picture storage unit to supply to the block matching circuit, and which controls the block matching circuit such that the block matching process is performed to the current block and the each reference block of the search window.

At least one of a shape of the search window, a size of the search window and a position of the search window is determined based on the estimation history.

The search window determining unit determines whether the number of previously estimated motion vectors exceeds a predetermined number. When it is determined that the number of previously estimated motion vectors is less than the predetermined number, the search window determining unit neglects the previously estimated motion vectors and determines optimal size and shape of the search window. On the other hand, when it is determined that the number of previously estimated motion vectors exceeds the predetermined number, the search window determining unit produces a 2-dimensional map in which each of the previously estimated motion vectors is mapped based on its horizontal value and the vertical value. Thus, the search window determining unit determines optimal size and shape of the search window such that the search window includes the history of the previously estimated motion vectors. Also, the search window determining unit calculates average values of changes of the previously estimated motion vectors in the horizontal and vertical directions, respectively, and determines an optimal position of the search window such that, for example, a center position of the search window is shifted based on the average values. In this manner, the size, shape and position may be independently determined. On the contrary, the size, shape and position may be collectively determined.

The motion vector estimating apparatus may further include a load detecting circuit for detecting either one of a load of the motion vector estimating apparatus or a load of the block matching circuit. In this case, the search window determining unit determines the search window based on the estimation history and the detected load. Also, the motion vector estimating apparatus may further include a voltage detecting circuit for detecting a power supply voltage. In this case, the search window determining unit determines the search window based on the estimation history and the detected power supply voltage. Further, the motion vector estimating apparatus may further include a temperature detecting circuit for detecting a temperature of a chip on which the block matching circuit is installed. In this case, the search window determining unit determines the search window based on the estimation history and the detected temperature. In addition, the search window determining unit may determine at least an unuseful region in the search window in unit of pixels based on the estimation history, and set a flag to each of pixels of the unuseful region such that the block matching process to the reference block which includes any pixel of the unuseful region is made invalid based on the flag of the pixel of the unuseful region.

The block matching circuit includes processing elements of M columns and N rows (M and N are positive integers) provided such that a likelihood between the current block and each of the reference blocks is calculated through pipeline processing. In this case, the block matching circuit may further include a hierarchical selector structure such that each of the processing elements is supplied with one of the pixel data of each of the reference blocks. Also, the block matching circuit may further include (M+N) reference data buses, which are provided for the M columns and the N rows, and N current data buses provided for the N rows, respectively. In this case, each of the (M+N) reference data buses transfers one pixel data of any of the reference blocks in a unit time of the pipeline processing. The current block is composed of M columns and N rows.

The processing elements may be cascade-connected in each of the N rows and the N rows may be cascade-connected.

In another case, the processing elements may be cascade-connected in each of the N rows (N is an even number). Odd-numbered ones of the N rows in an upper half are cascade-connected via first FIFO units, each of which is provided for two adjacent odd-numbered rows, wherein even-numbered ones of the N rows in the upper half are cascade-connected via second FIFO units, each of which is provided for two adjacent even-numbered rows, wherein odd-numbered ones of the N rows in a lower half are cascade-connected via third FIFO units, each of which is provided for two adjacent odd-numbered rows, and wherein even-numbered ones of the N rows in the lower half are cascade-connected via fourth FIFO units, each of which is provided for two adjacent odd-numbered rows. Further, the block matching circuit further includes fifth and sixth FIFO units connected to last stages of processing elements in the cascade connections for the odd-numbered rows and the even-numbered rows in the upper half, respectively. In this case, a number of stages in each of the first to fourth FIFO units is M, and a number of stages in the fifth FIFO unit is (M×N/2 +M), and a number of stages in the sixth FIFO unit is (M×N/2).

In order to achieve another aspect of the present invention, a motion vector estimating apparatus includes processing elements of M columns and N rows (M and N are positive integers) , wherein the processing elements are cascade-connected in each of the N rows, wherein each of the processing elements calculates an absolute value of a difference between a corresponding pixel data of a current block and one pixel data of each of reference blocks, and adds the absolute value to an output from a previous stage of processing element to output the adding result to a next stage of processing element, and wherein the N rows are cascade-connected to allow pipeline processing, M reference data column buses provided for the M columns, respectively, N reference data row buses provided for the N rows, respectively, (M×N) selectors, which are respectively provided for the processing elements to allow one of the pixel data on the corresponding one of the M reference data column buses and the pixel data on the corresponding one of the N reference data row buses to the corresponding processing element as the reference block pixel data, and a current block pixel data bus for transferring current block pixel data to each of the processing elements.

The motion vector estimating apparatus may further includes a reference block data bus group for transferring pixel data of the reference blocks in units of rows as sequences of pixel data, a first group of selectors which are respectively provided for the M reference data column buses, and each of which selects one pixel data of one of the sequences to supply to the corresponding reference data column bus, and a second group of selectors which are respectively provided for the N reference data row buses, and each of which selects one pixel data of one of the sequences to supply to the corresponding reference data row bus. In this case, each of the processing elements latches the corresponding current block pixel data once the corresponding current block pixel data is supplied via the current block pixel data bus. Also, each of the processing elements is synchronized with a clock signal to perform the calculation of the absolute value of the difference and the addition and to output the addition result to the next stage of processing element. Thus, the processing elements calculates a likelihood of one of the reference blocks in a time period from a first time to (M×N) time, and calculates a likelihood of a different one of the reference blocks in a time period from a second time to (M×N+1) time.

The current block is composed of pixels of M columns and N rows.

In a case, the processing elements are cascade-connected in each of the N rows and the N rows are cascade-connected.

In another case, the processing elements are cascade-connected in each of the N rows (N is an even number). In addition, odd-numbered ones of the N rows in an upper half are cascade-connected via first FIFO units, each of which is provided for two adjacent odd-numbered rows, even-numbered ones of the N rows in the upper half are cascade-connected via second FIFO units, each of which is provided for two adjacent even-numbered rows, odd-numbered ones of the N rows in a lower half are cascade-connected via third FIFO units, each of which is provided for two adjacent odd-numbered rows, and even-numbered ones of the N rows in the lower half are cascade-connected via fourth FIFO units, each of which is provided for two adjacent odd-numbered rows. Also, the block matching circuit further includes fifth and sixth FIFO units connected to last stages of processing elements in the cascade connections for the odd-numbered rows and the even-numbered rows in the upper half, respectively. In this case, a number of stages in each of the first to fourth FIFO units is M, and a number of stages in the fifth FIFO unit is (M×N/2+M), and a number of stages in the sixth FIFO unit is (M×N/2). The motion vector estimating apparatus may further include a fist adder adding an output of the fifth FIFO unit and an output of the sixth FIFO unit, a second adder adding the output of the fifth FIFO unit and an output of the processing element in a last stage of odd-numbered cascade connection in the lower half, a third adder adding the output of the sixth FIFO unit and an output of the processing element in a last stage of even-numbered cascade connection in the lower half, a fourth adder adding the output of the processing element in the last stage of odd-numbered cascade connection in the lower half and the output of the processing element in the last stage of even-numbered cascade connection in the lower half, and a fifth adder adding an output of the second adder and an output of the third adder.

In still another case, the processing elements are cascade-connected in each of the N rows (N is an even number). Also, ones of the N rows in an upper half are cascade-connected via first FIFO units, each of which is provided for two adjacent rows, and ones of the N rows in a lower half are cascade-connected via second FIFO units, each of which is provided for two adjacent rows. In addition, the block matching circuit further includes a third FIFO units connected to the processing element in a last stage of cascade connection in the upper half. In this case, a number of stages in each of the first and second FIFO units is M, and a number of stages in the third FIFO unit is (M×N/2). The motion vector estimating apparatus may further include an adder adding an output of the third FIFO unit and an output of the processing element in a last stage of cascade connection in the lower half.

In yet still another case, the processing elements are cascade-connected in each of the N rows (N is an even number). Also, odd-numbered ones of the N rows are cascade-connected via first FIFO units, each of which is provided for two adjacent odd-numbered rows, and even-numbered ones of the N rows are cascade-connected via second FIFO units, each of which is provided for two adjacent even-numbered rows. In this case, a number of stages in each of the first and second FIFO units is M. The motion vector estimating apparatus may further include an adder adding an output of the processing element in a last stage of odd-numbered cascade connection and an output of the processing element in a last stage of even-numbered cascade connection.

In order to achieve still another aspect of the present invention, a method of estimating a motion vector, includes the steps of:

determining estimation history from previously estimated motion vectors;

determining a search window based on the estimation history, wherein the search window is composed of rectangular reference regions; and performing a block matching process to a current block and each of reference blocks of the search window to determine a motion vector.

BRIEF DESCRIPTION OF THE DRAWINGS

FIG. 7 is a diagram for explaining the relation of a previous picture, a search window including reference blocks and a current block of a current picture;

DESCRIPTION OF THE PREFERRED EMBODIMENTS

A motion vector estimating apparatus of the present invention will be described below in detail with reference to the accompanying drawings.

Figure 1:
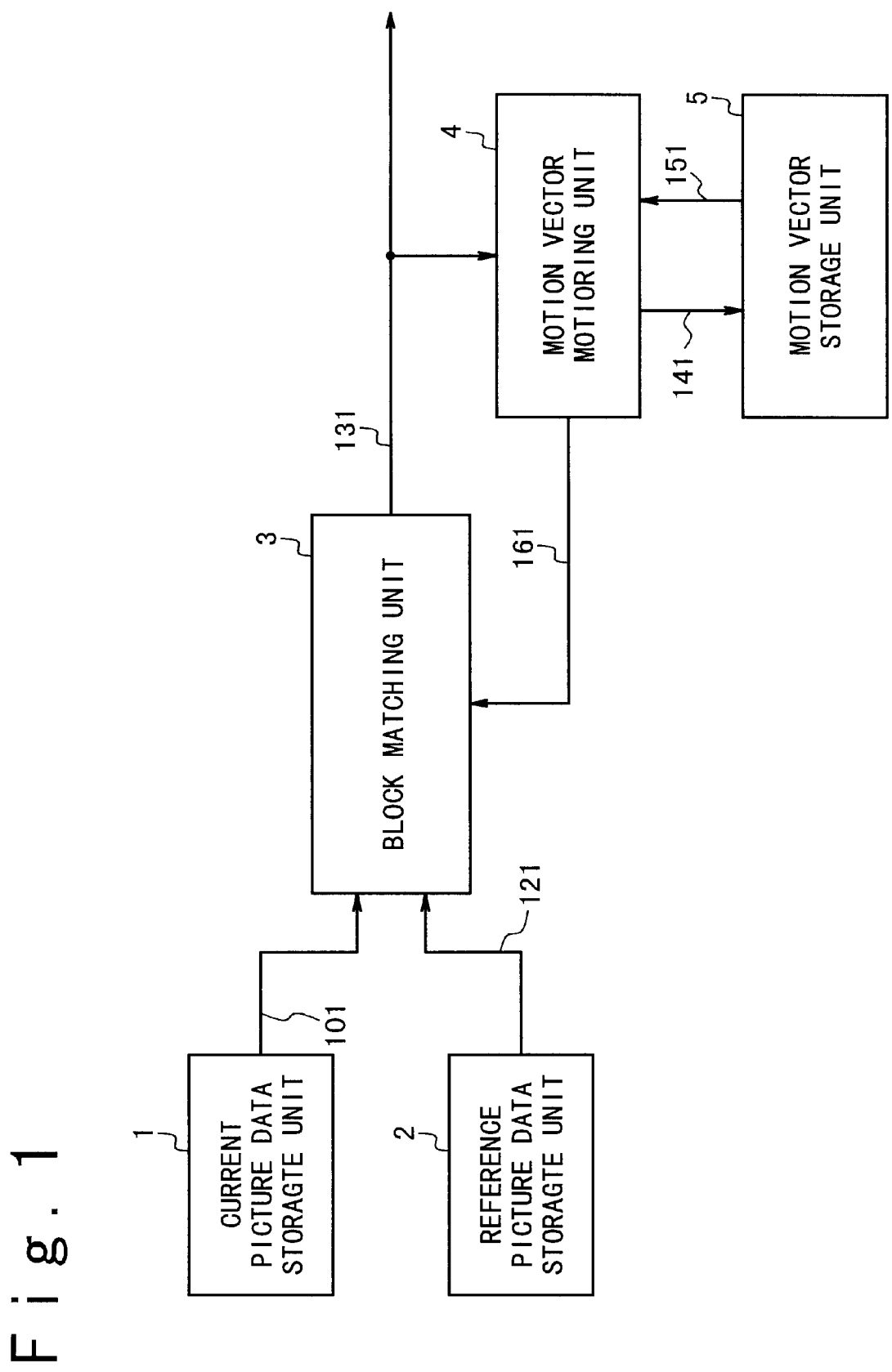
FIG. 1 is a block diagram illustrating of the structure of a motion vector estimating apparatus according to a first embodiment of the present invention.

FIG. 1 is a block diagram illustrating the structure of the motion vector estimating apparatus according to the first embodiment of the present invention. Referring now to FIG. 1, the motion vector estimating apparatus in the first embodiment is composed of a current picture data storage unit 1, a reference picture data storage unit 2, a block matching unit 3, a motion vector monitoring unit 4, and a motion vector storage unit 5.

The current picture data storage unit 1 stores image data of a current picture and pixel data C for pixels of a current block are read out from the storage unit 1 onto a signal line 101 by the block matching unit 3. The reference picture data storage unit 2 stores image data of a reference picture and pixel data for pixels of a reference block within a predetermined search window are read out from the storage unit 2 onto a signal line 121 by the block matching unit 3. The reference picture may be a previous picture to the current picture, or a different picture useful for estimating the motion vector.

The block matching unit 3 reads out the current block pixel data from the current picture data storage unit 1 and the reference block picture data from the reference picture data storage unit 2 for a block matching process. Then, the block matching unit 3 performs an operation for the block matching process indicated by the following equation (1) to the current block pixel data and the reference block pixel data. The block matching process is performed all the reference blocks of the search window.

$$D(k, m) = \sum_{i=1}^{M} \sum_{j=1}^{N} |R(k+i-1, m+j-1) C(i, j)| \quad \text{equation (1)}$$

where $C_{i,j}$ is one pixel data of the current block, $R_{i,j}$ is one pixel data of the current block, and M and N are the number of columns and the number of rows in the current block, respectively. The reference block having the maximum likelihood, i.e., a minimum value as a result of the block matching process operation is determined for estimating a motion vector.

The motion vector storage unit 5 stores previously estimated motion vectors. The motion vector monitoring unit 4 stores the motion vector outputted from the block matching unit 3 in the motion vector storage unit 5. Also, the motion vector monitoring unit 4 outputs a search window designation data to the block matching unit 3 based on the motion vectors stored in the storage unit 5. In other words, the motion vector monitoring unit 4 determines estimation history of the motion vectors based on the motion vectors stored in the motion vector storage unit 5. The motion vector monitoring unit 4 determines the size, shape and position of the search window based on the determined estimation history. That is, the motion vector monitoring unit 4 refers to the motion vector storage unit 5 to determine whether the number of previously estimated motion vectors exceeds a predetermined number. When it is determined that the number of previously estimated motion vectors is less than the predetermined number, the motion vector monitoring unit 4 neglects the previously estimated motion vectors and determines optimal size and shape of the search window based on the current block. When it is determined that the number of previously estimated motion vectors exceeds the predetermined number, the motion vector monitoring unit 4 produces a 2-dimensional map in which each of the previously estimated motion vectors is mapped based on its horizontal and the vertical values. Thus, the motion vector monitoring unit 4 determines optimal size and shape of the search window such that the search window includes the history of the previously estimated motion vectors. Also, the motion vector monitoring unit 4 calculates average values of changes of the previously estimated motion vectors in the horizontal and vertical directions, respectively, and determines an optimal position of the search window such that, for example, a center position of the search window is shifted based on the average values. In this manner, the size, shape and position may be independently determined. On the contrary, the size, shape and position may be collectively determined.

The motion vector monitoring unit 4 outputs the search window designation data 161 to the block matching unit 3. Thus, the size, shape and position of the search window may be changed in response to the search window designation data for every frame, for every block, or if necessary. Therefore, the search window determining process is not a bottleneck to restrict the processing speed of the block matching process.

In this manner, the shape, size and position of the search window is determined based on the estimation history of the previous motion vectors. Then, the block matching process is carried out between the current block and each of the reference blocks within the search window to detect a motion vector.

Also, in the present invention, the size, shape and position of the search window may be adaptively determined. Therefore, the size, shape or position of the search window is changed.

Figure 2:
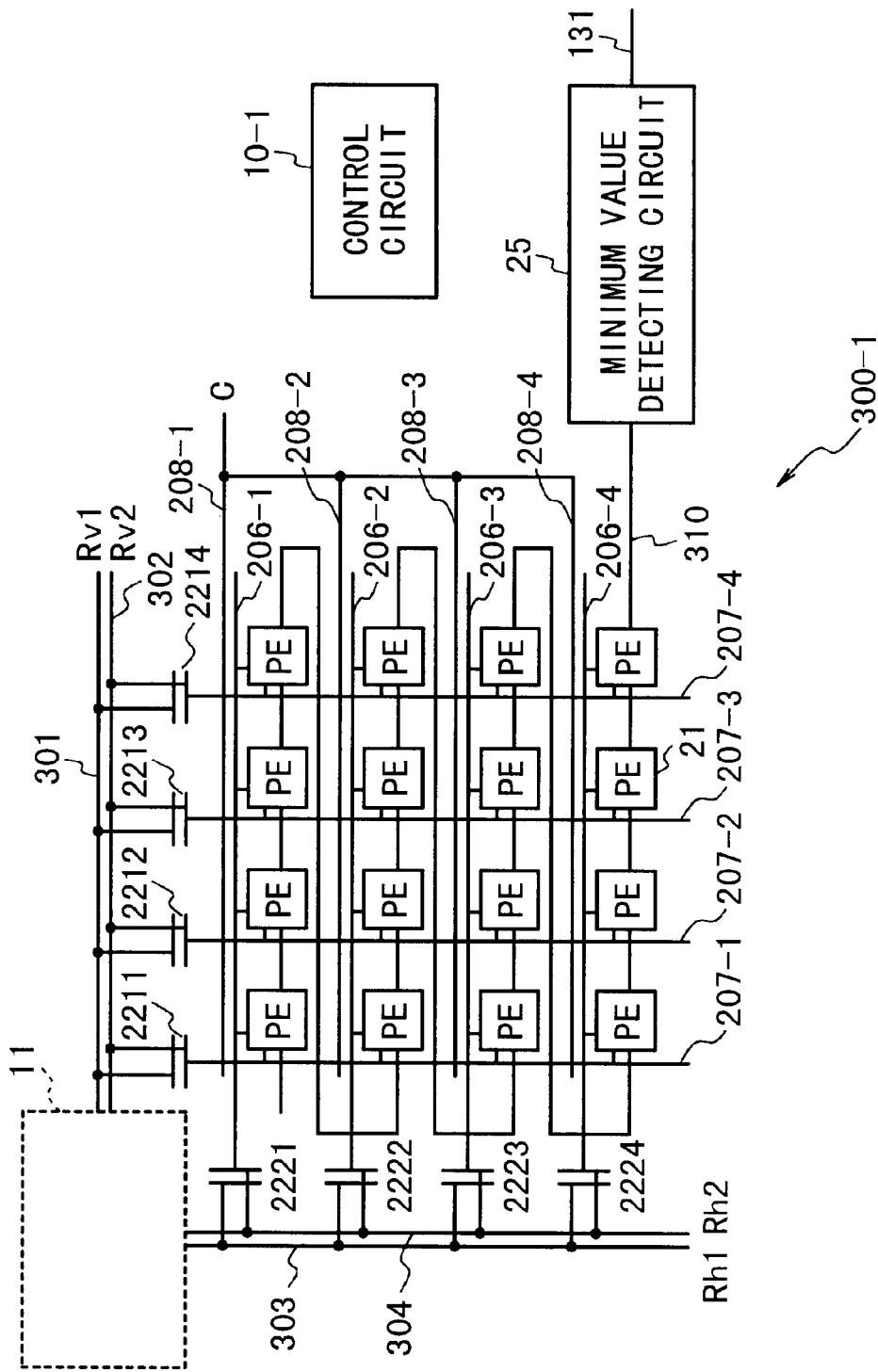
FIG. 2 is a block diagram illustrating the structure of a block matching unit in the motion vector estimating apparatus in the first embodiment shown in FIG. 1.

FIG. 2 is a block diagram illustrating the structure of the block matching unit 3 according to the first embodiment of the present invention. Referring to FIG. 2, the block matching unit 3 is composed of a control circuit 10-1 and a block matching circuit 300-1. The block matching unit 3 is formed on a semiconductor chip. However, only the block matching circuit 300-1 may be formed on the semiconductor chip.

The control circuit 10-1 receives the search window designation data 161 from the motion vector monitoring unit 4 to read the current block pixel data from the current picture data storage unit 1 and the pixel data for each of the reference blocks within the search window.

The block matching circuit 300-1 is composed of a plurality of processing elements 21 arranged in M columns and N rows (M and N are positive integers, respectively, and M=4 and N=4 in this example). The processing elements 21 are cascade-connected in units of rows and the rows are cascade-connected. The last processing element $PE_{4,4}$ of the cascade connection is connected to a minimum value detecting circuit 25. The minimum value detecting circuit 25 detects one of the reference blocks having the minimum value in the block matching process within the search window and outputs the minimum value reference block as a motion vector.

It is not required that the number of processing elements is equal to the number of pixels of the current block. However, if the total number of processing elements $PE_{M,N}$ is made equal to the number of pixels of the current blocks, FIFO units which are required in the conventional system can be omitted. As a consequence, the chip area of the block matching unit 3 can be reduced, and the power consumption can be reduced.

Also, the block matching circuit 300-1 is composed of (P+Q) reference block pixel data buses (P or Q is a positive integer more than 1), a first group of M selectors, and a second group of N selectors. In this example, the reference block pixel data buses are the Rv1, Rv2, Rh1 and Rh2 reference block pixel data buses 301, 302, 303 and 304 in this example. Sequences of pixel data for the reference blocks are supplied to the Rv1, Rv2, Rh1 and Rh2 reference block pixel data buses 301, 302, 303 and 304 from the reference picture data storage unit 2. Selectors 2211 to 2214 are provided as the first group of M selectors and are connected to the Rv1 and Rv2 reference block pixel data buses 301 and 302. Also, selectors 2221 to 2224 are provided for the second group of N selectors and are connected to the Rh1 and Rh2 reference block pixel data buses 303 and 304. The selectors 2211 to 2214 and 2221 to 2224 are controlled in response to control signals from the control circuit 10-1, respectively.

The block matching circuit 300-1 is further composed of Rh reference data buses 206-1 to 206-4, Rv reference data buses 207-1 to 207-4 and current data buses 208-1 to 208-4. Each of the Rh reference data buses 206-1 to 206-4 is provided for one of the selectors 2221 to 2224, and each of the Rv reference data buses 207-1 to 207-4 is provided for one of the selectors 2211 to 2214. Each of the reference data buses 206-1 to 206-4 and 207-1 to 207-4 transfers one reference block pixel data selected by the corresponding selector. Each of the current data buses 208-1 to 208-4 is provided for one of the rows of processing elements 21 in this example, and the current data buses 208-1 to 208-4 are connected to each other. Each of the plurality of processing elements is also connected to a corresponding one of the Rh reference data buses 206-1 to 206-4, a corresponding one of the Rv reference data buses 207-1 to 207-4, and a corresponding one of the current data buses 208-1 to 208-4. It should be noted that although the current data buses 208-1 to 208-4 are commonly connected in the structural example shown in FIG. 2, the current data buses 208-1 to 208-4 are not always commonly connected.

The block matching circuit 300-1 is further composed of a circuit 11. The circuit 11 switches the pixel data read from the reference picture data storage unit 2 between the reference block pixel data buses 301 to 304. The circuit 11 may includes shift registers, each of which latches one row of reference block pixel data and outputs the pixel data of the row one by one. Thus, the read operation from the reference picture data storage unit 2 can be simplified. However, the reference block pixel data buses 301 to 304 may be directly connected to the reference picture data storage unit 2. In this case, the circuit 11 can be omitted and the read operation is controlled by the control circuit 10-1.

Figure 3:
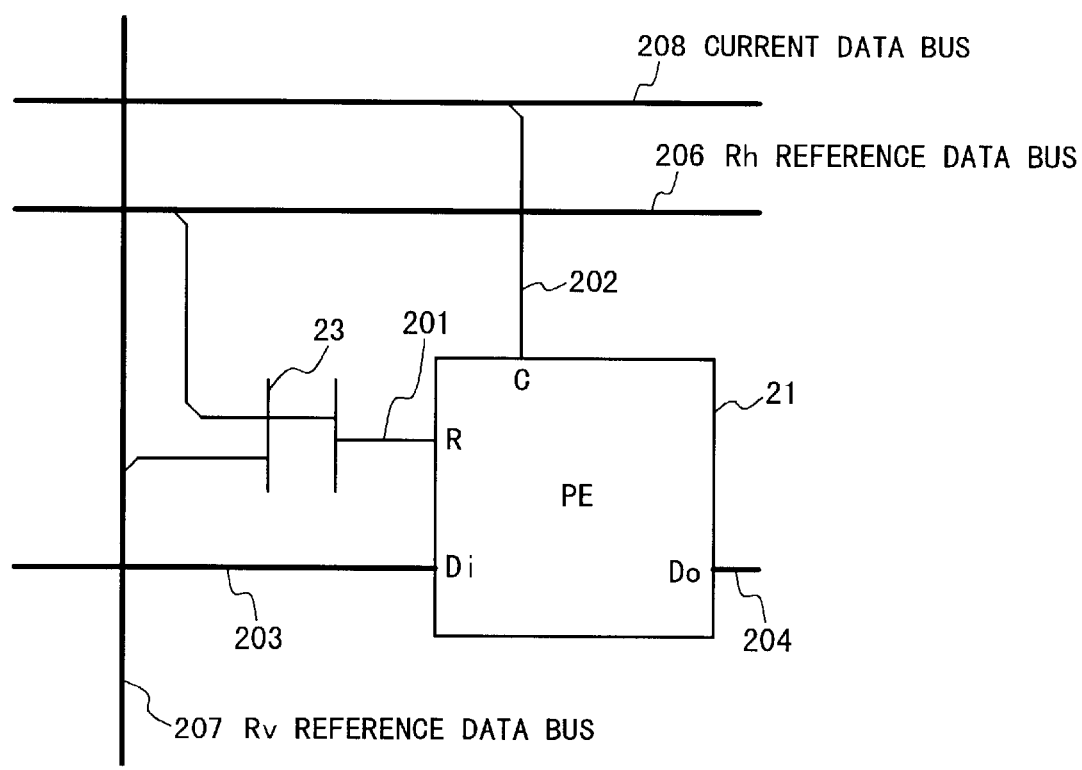
FIG. 3 is a connection diagram for explaining connections of a processing element in the block matching unit in the first embodiment shown in FIG. 2.

FIG. 3 is a block diagram illustrating the structure of each of the plurality of processing elements 21 and the peripheral portion in the first embodiment. Referring to FIG. 3, the processing element (PE) 21 is connected to the output port Do of a previous stage of processing element 21 via a signal line 203 and the input port Di of a next stage of processing element via a signal line 204. The processing element is connected to the corresponding current data bus 208 at a terminal C, and to the corresponding Rh and Rv reference data buses 206 and 207 through a selector 23, which is not shown in FIG. 3. The selector 23 is controlled in response to a control signal from the control circuit 10-1. One of reference pixel data on the corresponding Rh reference data bus 206 and reference pixel data on the corresponding Rv reference data bus 207 is selected by the selector 23. Then, the processing element 21 performs a calculation in response to a control signal from the control circuit 10-1 using the current pixel data received from the corresponding current data bus 208 and the selected reference pixel data. In the calculation, an absolute value of a difference between the current pixel data and the selected reference pixel data is calculated. In response to a control signal from the control circuit 10-1, the calculation result is added to the data received at the terminal Di from the previous stage of processing element. The adding result is outputted from the terminal Do for the next stage of processing element such that pipeline processing is allowed. The calculation and the addition are performed synchronously between the processing elements in response to the control signals or clock signals from the control circuit 10-1. Thus, the block matching process can be performed in a pipeline manner.

Figure 4:
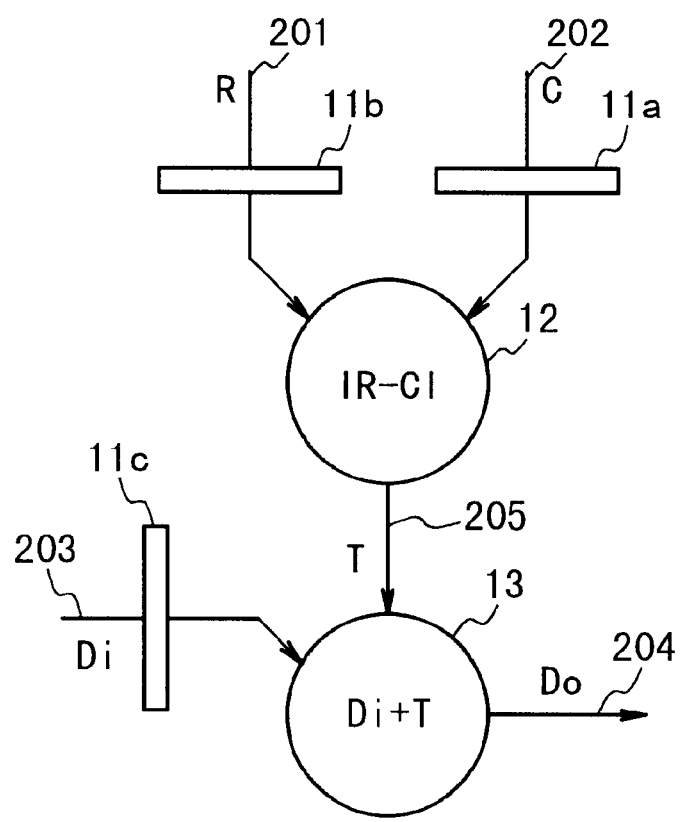
FIG. 4 is a block diagram illustrating the internal structure of a processing element shown in FIG. 3.

FIG. 4 is a block diagram illustrating the structure of the processing element as a minimum unit for constituting the block matching circuit 300 shown in FIG. 2. Referring to FIG. 4, the processing element 21 is composed of registers 11a, 11b and 11c, a calculating element 12 and an adding element 13. The registers 11a, 11b and 11c are pipeline registers. The calculating element 12 calculates an absolute value (T=|IR−CI|) 205 of a difference between the pixel data CI of the current block which is supplied from the current data bus 208 via a signal line 202 and the pixel data IR of the reference block which is supplied from the selector 23 via a signal line 201. The adding element 13 adds the data Di received at the Di port via the signal line 203 and the absolute value T 205, namely, (Di+T), and then outputs the summation from the Do port onto a signal line 204. In this manner, the pipeline processing is performed.

Figure 5:
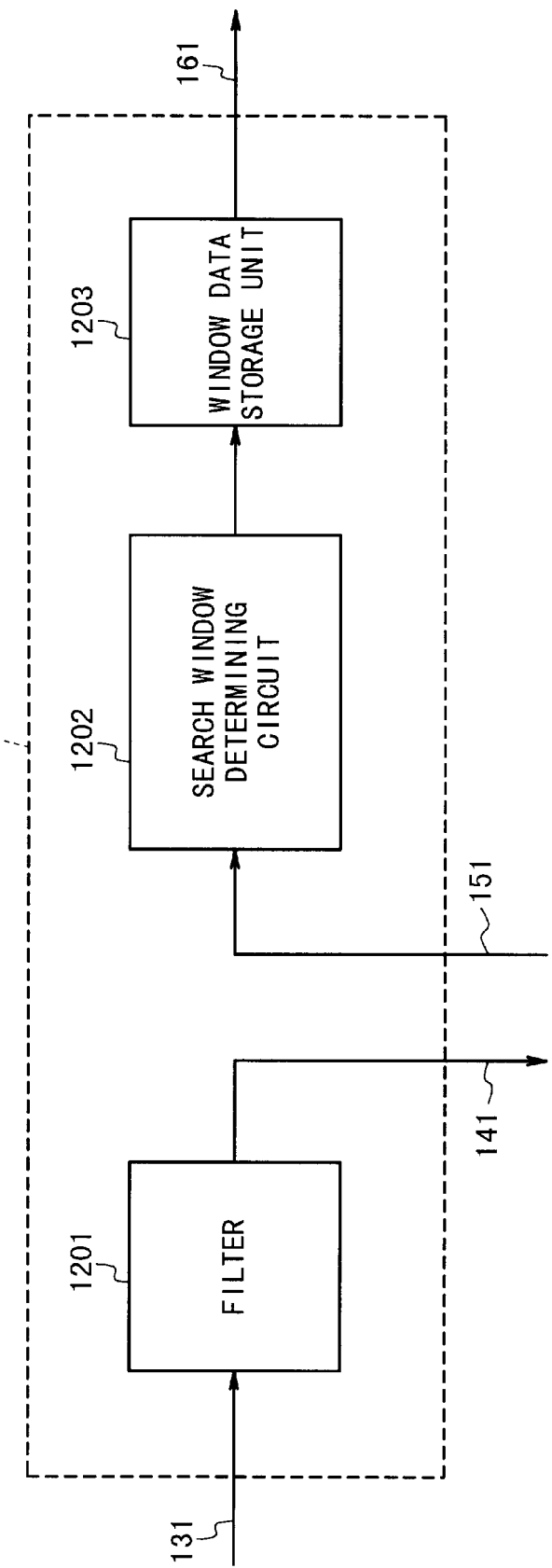
FIG. 5 is a block diagram illustrating the structure of a motion vector monitoring unit of the motion vector estimating apparatus in the first embodiment shown in FIG. 1.

FIG. 5 is a block diagram illustrating the motion vector monitoring unit 4. Referring to FIG. 5, the motion vector monitoring unit 4 is composed of a filter 1201, a search window determining circuit 1202, and a window data storage unit 1203. The filter 1201 filters the motion vector estimated by the block matching unit 3. The filtered motion vector is stored in the motion vector storage unit 5. The search window determining circuit 1202 refers to the motion vector storage unit 5 to determine a search window from the estimation history of previously estimated motion vectors stored in the motion vector detecting unit 5. Also, the search window determining circuit 1202 stores a data designating the determined search window in the window data storage unit 1203. It should be noted that the filter 1201 may be replaced by another filter, or may be omitted.

The above-explained search window designating data is composed of, for instance, an upper left position, height and width of each of rectangular reference regions of the determined search window, which will be described below.

Figure 6A:
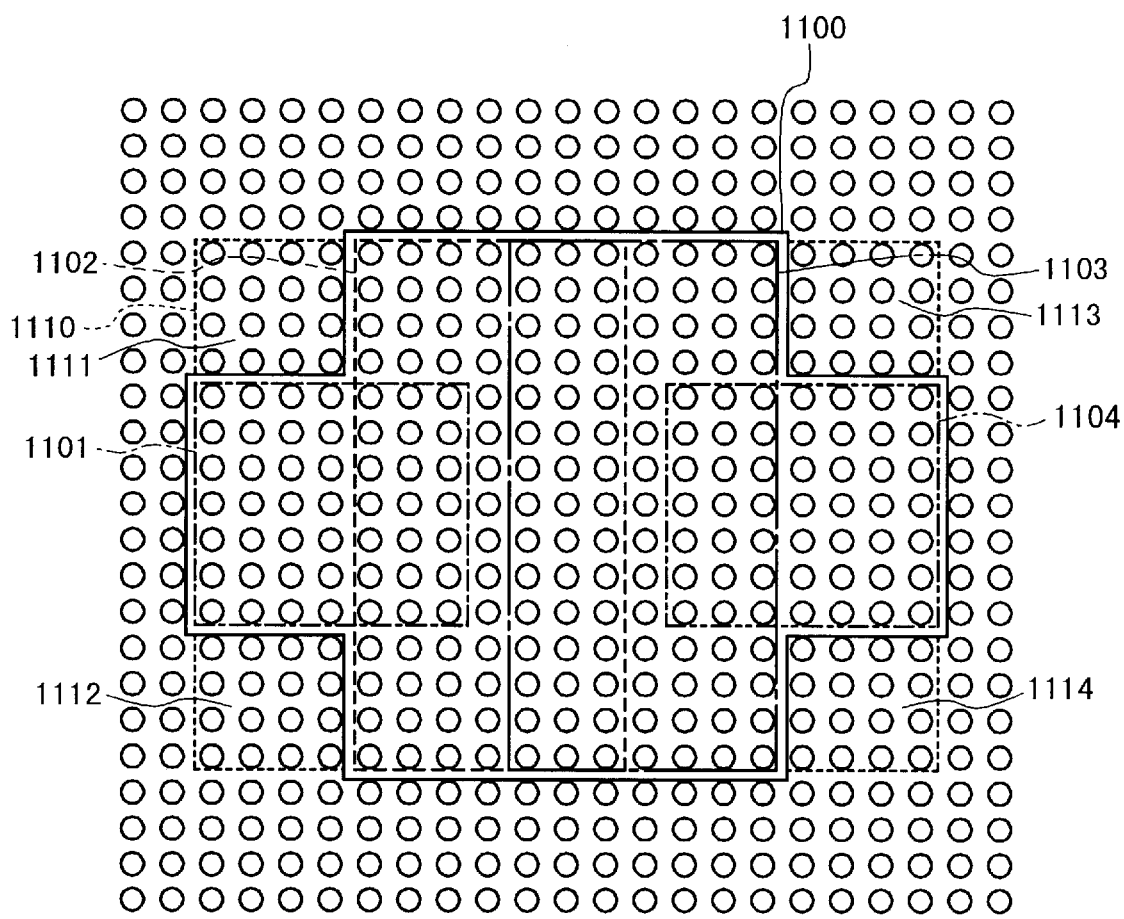
FIG. 6A is a diagram for explaining a search window which is formed in such a manner that a plurality of rectangular shapes are synthesize, in the first embodiment of the present invention.
Figure 6B:
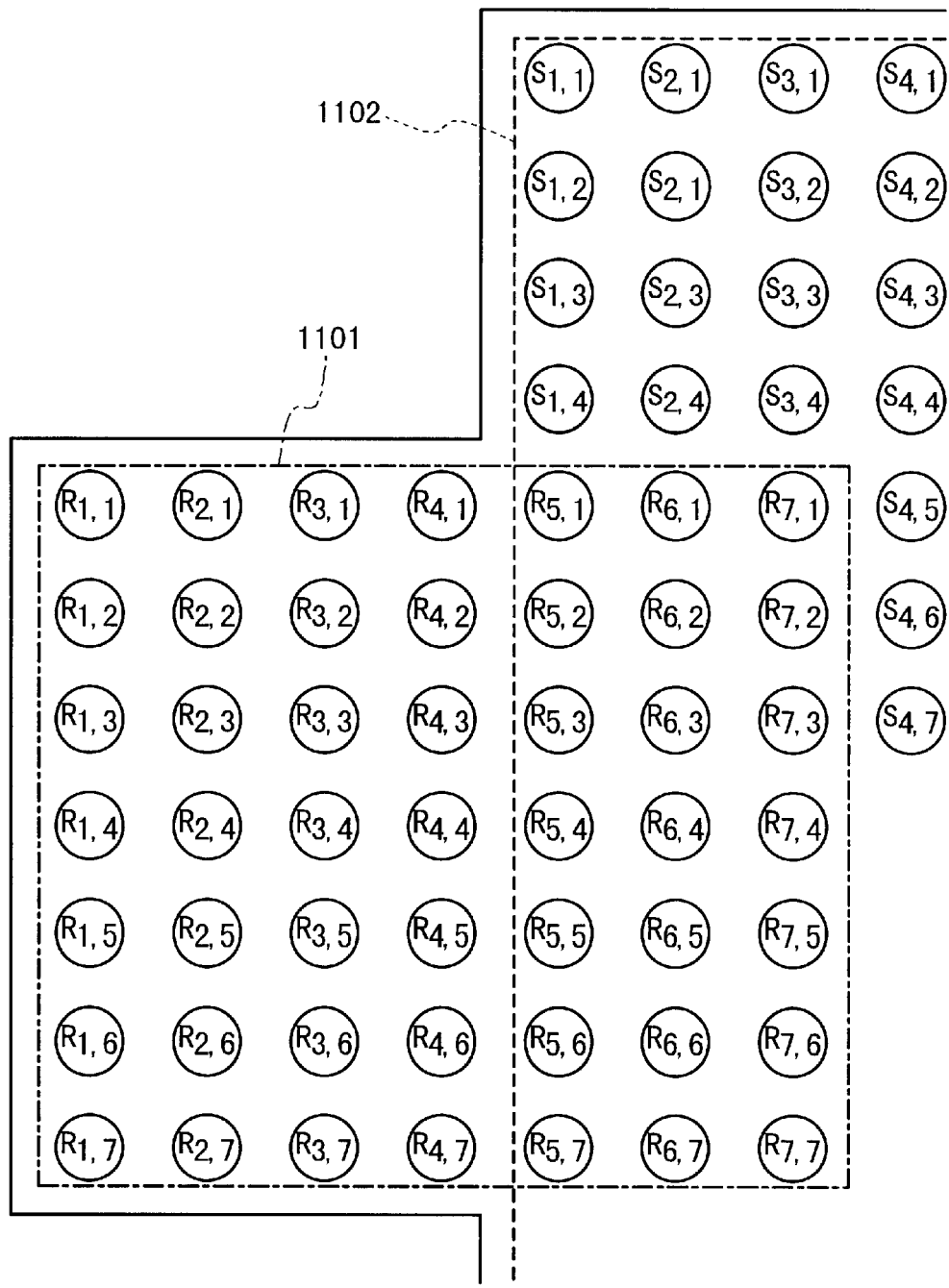
FIG. 6B is a partial expanded diagram for explaining the search window shown in FIG. 6A.

An example of the search window used in the present invention will be described below with reference to FIGS. 6A and 6B. FIG. 6A is a diagram schematically illustrating the search window and FIG. 6B is a partial expanded diagram of the search window shown in FIG. 6A. Referring to FIG. 6A, the search window 1100 is composed of a plurality of rectangular reference regions 1101, 1102, 1103, and 1104, which overlap one after another. That is, the reference regions 1101, 1102, 1103, and 1104 are synthesized to form the search window 1100. The search window 1100 in the present invention is not necessarily required to have a rectangular shape, unlike the conventional system. In the block matching unit 3 according to the first embodiment of the present invention, even when the search window is not rectangular but has a concave region and/or a convex region, this search window may be divided into the plurality of rectangular reference regions.

On the other hand, a conventional search window 1110 is illustrated by a dot line in FIG. 6A and has a rectangular shape. The search window 1100 is different from that of the conventional example in regions 1111, 1112, 1113 and 1114. These regions are determined by the search window determining circuit 1202 to be unnecessary to perform the block matching process. In the present invention, the block matching process is not performed to the regions 1111, 1112, 1113 and 1114. Therefore, the block matching process can be completed at high speed. Even when the block matching process is carried out in this manner, since the operation speed of the processing elements 21 can be maintained at 100%, this shape of the search window never give adverse influence to the process time and the power consumption.

Referring back to FIG. 1, the motion vector monitoring unit 4 monitors and stores the motion vectors obtained from the block matching unit 3 in the motion vector storage unit 5. The motion vector monitoring unit 4 changes the shape, size, and/or position of the search window based on the motion vectors stored in the motion vector storage unit 5, i.e., the estimation history of the previously estimated motion vectors. Because the block matching unit 3 according to the first embodiment of the present invention is applied to the search window having any concave regions and convex regions, the efficiency of the block matching process is not decreased. As a consequence, since the estimation history of the previously estimated motion vector is more effectively reflected, there is no need to carry out the block matching process to the waste reference regions such as the regions 1111, 1112, 1113 and 1114. Thus, the resultant processing time and the resultant power consumption can be reduced.

Also, even if the size of the search window is changed based on the estimation history of the motion vectors, the number of reference regions is merely increased and/or decreased. There is no change in the rule of the sequences of pixel data supplied into the block matching unit 3, as described later. As a consequence, in accordance with this embodiment, the size, shape and/or position of the search window can be changed without making the block matching unit 3 complex.

In the present invention, the size, shape, and/or the position of the search window is adaptively changed based on the previous motion vectors. As a result, the block matching process is not performed to the regions 1111 to 1114 which are not originally required to perform the block matching process. Therefore, the processing time and amount can be reduced. As a consequence, the power consumption required for the block matching process can be reduced. Also, there is no detection of any erroneous motion vector by performing the block matching process operation to the improper regions.

Next, the operation of the block matching process in the motion vector estimating apparatus according to the first embodiment of the present invention will be described below in detail. In this example, it is assumed that the current block is composed of 16 pixels of 4×4 ($C_{1,1}$ to $C_{4,4}$). The search window is shown in FIG. 6A. The reference region 1101 of the search window is composed of 49 pixels of 7×7 ($R_{1,1}$ to $R_{7,7}$) and the reference region 1102 of the search window is composed of 105 pixels of 7×15. Also, it is assumed that the block matching circuit 300 includes (4×4) processing elements as shown in FIG. 2.

FIG. 7 shows the relation of the previously estimated motion vectors, the search window, the reference block and the current block.

In the start of the block matching process, the motion vector monitoring unit 4 refers to the motion vector storage unit 5 and determines the search window based on the motion vectors previously estimated. In this case, the motion vector monitoring unit 4 determines from the previously estimated motion vectors that there is no case where a new motion vector is found out in the regions 1111, 1112, 1113 and 1114, and determines the search window, as shown in FIG. 6A. Then, the reference regions 1101 to 1104 constituting the search window are determined and data designating each of the reference regions 1101 to 1104 is stored in the window data storage unit 1203. Also, the data designating the reference regions as the search window designation data is supplied to the control circuit 10-1 of the block matching unit 3. The control circuit 10-1 determines pixel data to be read out from the current picture data storage unit 1 and the reference picture data storage unit 2. The pixel data read out from the current picture data storage unit 1 and the reference picture data storage unit 2 are supplied to the block matching circuit 300-1 of the block matching unit 3. Thus, the block matching process is started.

Figure 8A:
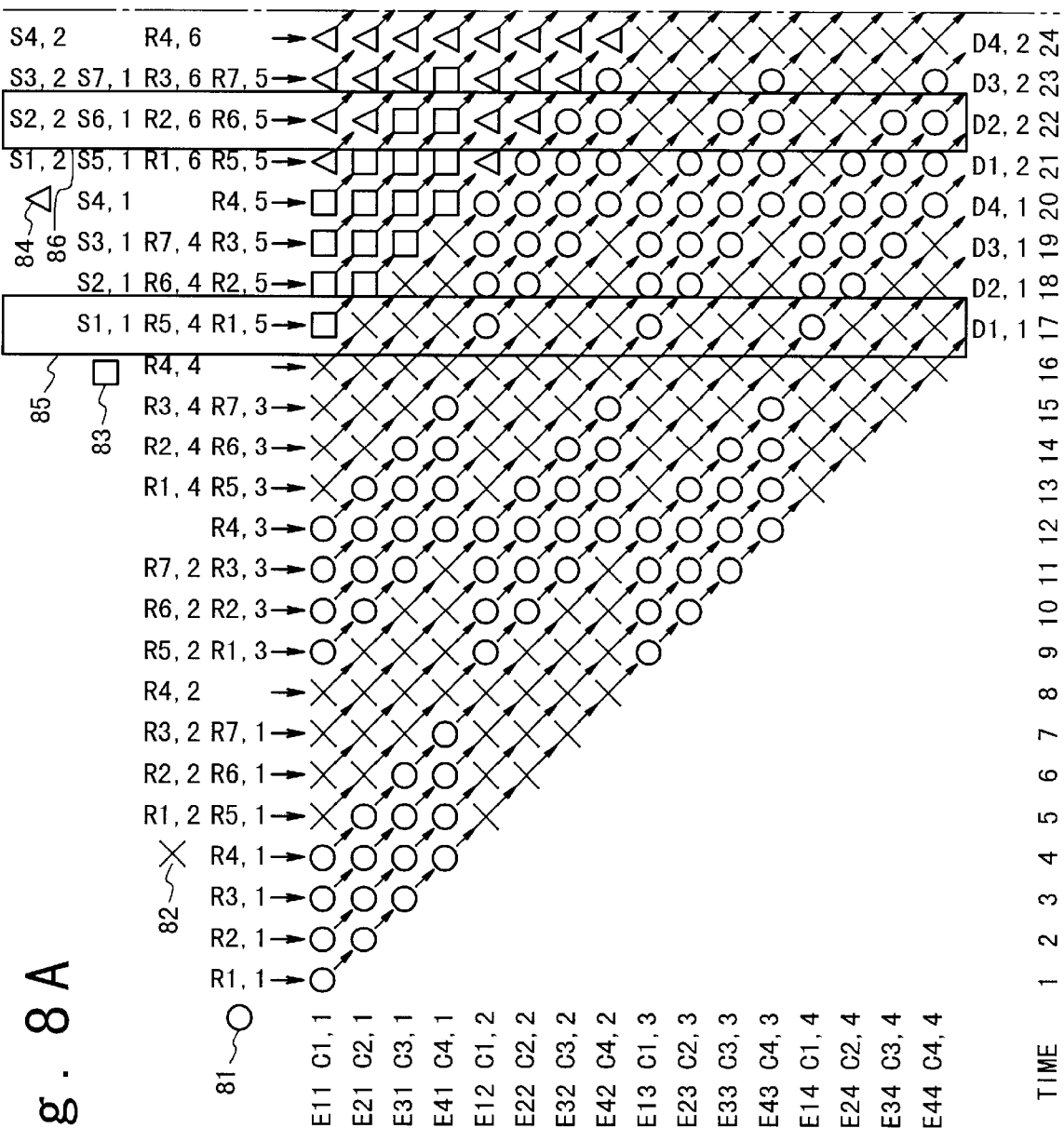
FIGS. 8A and 8B are schematic diagrams for explaining a block matching process operation of the block matching unit in the first embodiment of the present invention.
Figure 8B:
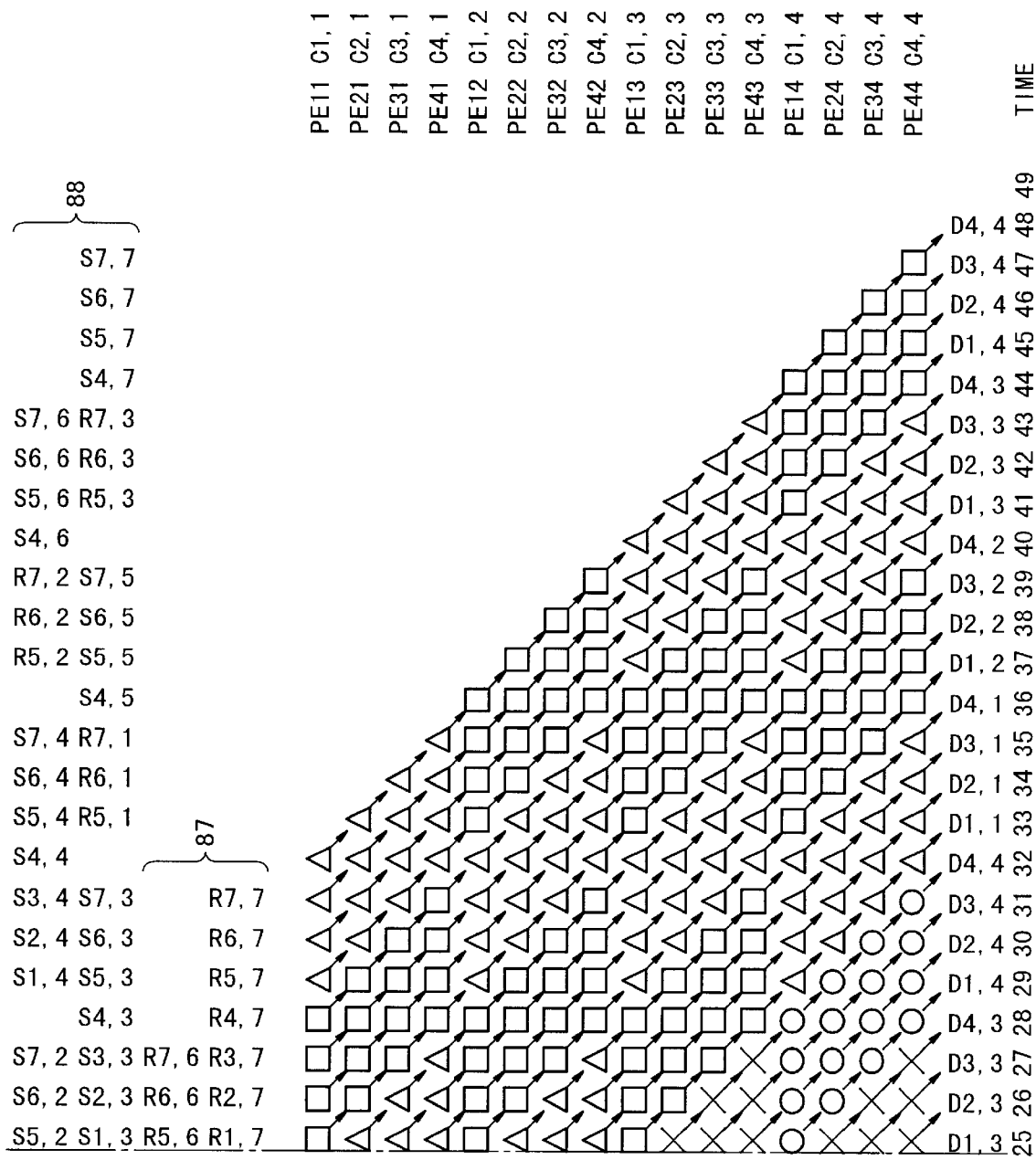

FIGS. 8A and 8B are diagrams schematically illustrating the pipeline processing for the block matching process. In FIGS. 8A and 8B, an abscissa denotes time. Symbols $C_{1,1}$ to $C_{4,4}$ represent pixel data of the current block. Symbols $R_{1,1}$ to $R_{7,7}$ represent pixel data of the reference region 1101, and symbols $S_{1,1}$ to $S_{4,4}$ and $R_{5,1}$ to $R_{7,7}$ and so on represent pixel data of the reference region 1102 as shown in FIG. 6B. Furthermore, each of symbols $D_{1,1}$ to $D_{4,4}$ represents data which indicates a likelihood of the corresponding reference block and which is supplied to the minimum value detecting circuit 25. The likelihood data is calculated based on the following equation (2):

$$D(k, m) = \sum_{i=1}^{4}\sum_{j=1}^{4} |R(k + i - 1, m + j - 1) - C(i, j)| \quad \text{equation (2)}$$

In this formula, symbol "k" is selected to be 1 to 4, and symbol "m" is selected to be 1 to 4.

As apparent from FIGS. 8A and 8B, four different sequences of pixel data 81 to 84 supplied to the processing elements are shown by symbols ○, ×,□ and ∆. As illustrated in FIGS. 8A and 8B, the sequences of pixel data 81 to 84 are sequentially supplied to the block matching circuit 300-1. That is, at a time 1, a pixel data $C_{1,1}$ of the current block is supplied to the processing element $PE_{1,1}$ via the current data bus 208-1. At the same time, a pixel data $R_{1,1}$ of the reference block of the reference region 1101 (FIG. 6B) is supplied to the processing element $PE_{1,1}$ from the sequence of pixel data 81. In the processing element $PE_{1,1}$ these pixel data are latched by the registers 11a and 11b and an absolute value of a difference between these pixel data, i.e., $|R_{2,1} - C_{1,1}|$ is calculated by the calculating element 12. Because the processing element $PE_{1,1}$ is a head element of the cascade connection so that the data Di of "0" is supplied from the register 11c, the processing element $PE_{1,1}$ outputs the absolute value of the difference from the output port Do to the input port Di of the next stage of processing element $PE_{2,1}$ at a time 2.

At the time 2, a pixel data $C_{2,1}$ of the current block is supplied to the processing element $PE_{2,1}$ from via the current data bus 208-1. The pixel data $C_{2,1}$ of the current block is supplied to the processing element $PE_{2,1}$. At the same time, a pixel data $R_{2,1}$ of the reference block is supplied to the processing elements $PE_{1,1}$ and $PE_{2,1}$ from the sequence of pixel data 81.

In the processing element $PE_{1,1}$ since the pixel data $C_{1,1}$ has been already latched by the register 11a, the pixel data $R_{2,1}$ is latched by the register 11b and then an absolute value of a difference between these pixel data $R_{2,1}$ and $C_{1,1}$ i.e., $|R_{2,1} - C_{1,1}|$ is calculated by the calculating element 12. The processing element $PE_{1,1}$ outputs the absolute value of the difference from the output port Do to the input port Di of the next stage of processing element $PE_{2,1}$ at a time 3. Also, in the processing element $PE_{2,1}$, the pixel data $C_{2,1}$ and $R_{2,1}$ are latched by the registers 11a and 11b and an absolute value of a difference between these pixel data, $|R_{2,1} - C_{2,1}|$ is calculated by the calculating element 12. The adding element 13 adds the absolute value of the difference to the calculation result $|R_{1,1} - C_{1,1}|$ supplied from the processing element $PE_{1,1}$ via the input port Di. The processing element $PE_{2,1}$ outputs the summation absolute value of the difference from the output port Do to the input port Di of the next stage of processing element $PE_{3,1}$ at a time 3.

After a time 4, the processing elements $PE_{1,1}$, $PE_{2,1}$, $PE_{3,1}$ and $PE_{4,1}$ are in the following holding states. That is, in the processing element $PE_{4,1}$ a data of $|R_{1,1}-C_{1,1}|+|R_{2,1}-C_{2,1}|+R_{3,1}-C_{3,1}+R_{4,1}-C_{4,1}|$ is stored. Similarly, in the processing element $PE_{3,1}$, a data of $|R_{2,1}-C_{1,1}|+|R_{3,1}-C_{2,1}|+|R_{4,1}-C_{3,1}|$ is stored. In the processing element $PE_{2,1}$, a data of $|R_{3,1}-C_{1,1}|+|R_{4,1}-C_{2,1}|$ is stored. In the processing element $PE_{1,1}$, a data of $|R_{4,1}-C_{1,1}|$ is stored.

At a time 5, a pixel data $C_{1,2}$ of the current block is supplied to the processing element $PE_{1,2}$ from via the current data bus 208. The pixel data $C_{1,2}$ of the current block is latched in the processing element $PE_{1,2}$. At the same time, a pixel data $R_{1,2}$ of the reference block is supplied to the processing elements $PE_{1,1}$ and $PE_{1,2}$ from the sequence of pixel data 82. Also, a pixel data $R_{5,1}$ of the reference block is supplied to the processing elements $PE_{2,1}$, $PE_{3,1}$ and $PE_{4,1}$ from the sequence of pixel data 81.

In the processing element $PE_{1,1}$, since the pixel data $C_{1,1}$ has been already latched by the register 11a, the pixel data $R_{1,2}$ is latched by the register 11b and then an absolute value of a difference between these pixel data $R_{2,1}$ and $C_{1,1}$ i.e., $|R_{1,2}-C_{1,1}|$ is calculated by the calculating element 12. The processing element $PE_{1,1}$ outputs the absolute value of the difference from the output port Do to the input port Di of the next stage of processing element $PE_{2,1}$ at a time 6.

Also, in the processing element $PE_{2,1}$ since the pixel data $C_{2,1}$ has been latched by the register 11a, the pixel data $R_{5,1}$ is latched by the register 11b and an absolute value of a difference between these pixel data, $|R_{5,1}-C_{2,1}|$ is calculated by the calculating element 12. The adding element 13 adds the absolute value of the difference to the calculation result supplied from the processing element $PE_{1,1}$ via the input port Di. The processing element $PE_{2,1}$ outputs the summation absolute value of the difference from the output port Do to the input port Di of the next stage of processing element $PE_{3,1}$ at the time 6.

Also, in the processing element $PE_{1,2}$, since the pixel data $C_{1,2}$ and $R_{1,2}$ are latched by the registers 11a and 11b and an absolute value of a difference between these pixel data, $|R_{1,2}-C_{1,2}|$ is calculated by the calculating element 12. The adding element 13 adds the absolute value of the difference to the calculation result supplied from the processing element $PE_{4,1}$ via the input port Di. The processing element $PE_{1,2}$ outputs the summation absolute value of the difference from the output port Do to the input port Di of the next stage of processing element $PE_{2,2}$ at the time 6.

The operation described above is repeated from the time 6 to a time 16.

At a time 17, the likelihood $D_{1,1}$ of the reference block having the pixel data of $R_{1,1}$ to $R_{4,4}$ is obtained. In this manner, the likelihoods $D_{1,1}$ to $D_{4,4}$ for the reference blocks of the reference region 1101 can be sequentially obtained in a time interval from the time 17 to time 32 in a pipeline manner.

At the same time, at the time 17, a pixel data $S_{1,1}$ of the next reference region 1102 (FIG. 6B) is supplied to the processing element $PE_{1,1}$ from the sequence of pixel data 83 with no waste rest. The pixel data $S_{1,1}$ is used together with the pixel data $C_{1,1}$ to calculate an absolute value of a difference between the pixel data $S_{1,1}$ and $C_{1,1}$. In this manner, the block matching process to the next reference region 1102 is started in a continuous state from the reference region 1101 with no wasted processing time.

In this manner, 16 pixel data of the current block in maximum are used at the same time. However, because the same current block pixel data are used in the same processing elements, the number of pixel data of the current block to be supplied at the time can be reduced to "1" if the pixel data already supplied is latched. In other words, in the block matching process shown in FIGS. 8A and 8B, since the block matching process is carried out to the same current block, the entry of the pixel data $C_{1,1}$ to $C_{4,4}$ of the current block to the processing elements $PE_{1,1}$ to $PE_{4,4}$ is complete from the time 1 to the time 16. Also, the number of pixel data to be entered at the same time is selected to be 1.

On the other hand, the pixel data of the reference region are simultaneously supplied to 1, 2, 3 or 4 processing elements. The sequence of pixel data 81 and the sequence of pixel data 82 are the pixel data present within the same reference region 1101 shown in FIGS. 6A and 6B. Also, the sequence of pixel data 83 and the sequence of pixel data 84 are the pixel data present within the same reference region 1102. There is no problem even when these two reference regions 1101 and 1102 are overlapped with each other.

According to the first embodiment of the present invention, the size, shape, and/or position of the search window is flexibly determined. Therefore, the bus wiring lines of the block matching circuit 300-1 are formed to be adaptive for the search window which is divided into a plurality of reference regions. As a consequence, even when the block matching process is performed in the parallel manner, this parallel degree is not decreased. The block matching process can be performed within a short time, and the power consumption can be reduced. Also, according to the first embodiment of the present invention, even when the search window is made small, the motion vector can be detected in high precision.

Figure 9A:
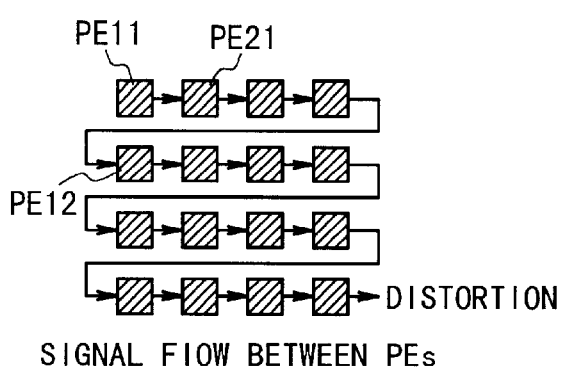
FIGS. 9A to 9F are schematic diagrams for explaining the block matching process operation of the block matching unit and the supply and selection of a reference block image data in the first embodiment of the present invention.

Next, the supply of the pixel data of the reference region will be described below. FIGS. 9A shows the cascade connection of the processing elements $PE_{1,1}$ to $PE_{4,4}$, as shown in FIG. 2. FIGS. 9B to 9F show the manner in which the pixel data of the reference regions are supplied at the times 1, 2, 5, 9 and 17 of FIGS. 8A and 8B.

Figure 9B:
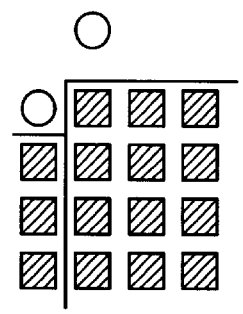

Referring to FIG. 9B, the pixel data $R_{1,1}$ of the sequence of pixel data 81 is supplied on, for example, the Rv1 reference block pixel data bus 301. At this time, the selector 2211 is controlled in response to a control signal from the control circuit 10-1 to select the pixel data on the Rv1 reference block pixel data bus 301 such that the selected pixel data is transferred onto the reference data bus 207-1. Also, the selector 23 corresponding to the processing element $PE_{1,1}$ is controlled in response to a control signal from the control circuit 10-1 to select the pixel data on not the Rh reference data bus 206-1 but the Rv reference data bus 207-1. Thus, the pixel data $R_{1,1}$ can be supplied to the processing element $PE_{1,1}$.

Figure 9C:
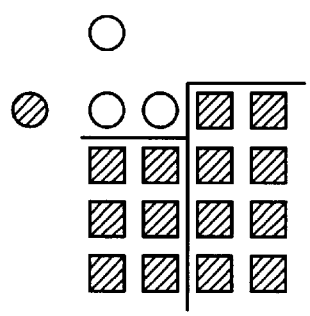

Next, as shown in FIG. 9C, at the time 2, the pixel data $R_{2,1}$ is supplied in the same manner as the pixel data $R_{1,1}$. The selectors 23 corresponding to the processing elements $PE_{1,1}$ and $PE_{2,1}$ are controlled in response to control signals from the control circuit 10-1 to select the pixel data on not the Rh reference data bus 206-1 but the Rv reference data buses 207-1 and 207-2. Thus, the pixel data $R_{2,1}$ can be supplied to the processing elements $PE_{1,1}$ and $PE_{2,1}$.

Figure 9D:
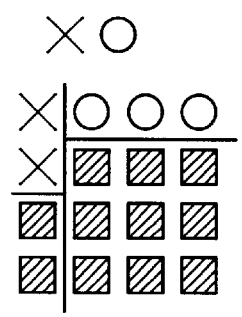

Next, as shown in FIG. 9D, at the time 5, the pixel data $R_{5,1}$ of the sequence of the pixel data 81 is supplied on the Rv reference block pixel data bus 301 in the same manner as the pixel data $R_{1,1}$. Also, the pixel data $R_{1,2}$ of the sequence of the pixel data 82 is supplied on, for example, the Rv reference block pixel data bus 302. At this time, the selector 2211 is controlled in response to a control signal from the control circuit 10-1 to select the pixel data $R_{1,2}$ on the Rv reference block pixel data bus 301 such that the selected pixel data is transferred onto the reference data bus 207-1. The selectors 23 corresponding to the processing elements $PE_{2,1}$ to $PE_{4,1}$ are controlled in response to control signals from the control circuit 10-1 to select the pixel data $R_{5,1}$ on not the Rh reference data bus 206-1 but the Rv reference data buses 207-2 to 207-4. Thus, the pixel data $R_{5,1}$ can be supplied to the processing elements $PE_{2,1}$ to $PE_{4,1}$. Also, the selectors 23 corresponding to the processing elements $PE_{1,1}$ to $PE_{1,2}$ are controlled in response to control signals from the control circuit 10-1 to select the pixel data $R_{1,2}$ on not the Rh reference data buses 206-1 and 206-2 but the Rv reference data bus 207-1. Thus, the pixel data $R_{1,2}$ can be supplied to the processing elements $PE_{1,1}$ and $PE_{1,2}$.

Figure 9E:
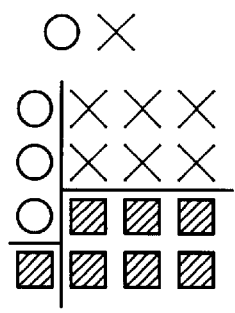

Next, as shown in FIG. 9E, at the time 9, the selectors 2211, 2221 and 2222 are controlled in response to control signals from the control circuits 10-1 such that the pixel data $R_{1,3}$ of the sequence of the pixel data 81 is supplied to the Rv reference data bus 207-1 and the pixel data $R_{5,2}$ of the sequence of the pixel data 82 is supplied to the Rh reference data buses 206-1 and 206-2. Then, the selectors 23 corresponding to the $PE_{1,1}$ to $PE_{1,3}$ are controlled by the control circuit 10-1 such that the pixel data $R_{1,3}$ is supplied to the processing elements $PE_{1,1}$ $PE_{1,2}$ and $PE_{1,3}$ and the pixel data $R_{5,2}$ is supplied to the processing elements $PE_{2,1}$ to $PE_{4,1}$ and $PE_{2,2}$ to $PE_{4,2}$.

Figure 9F:
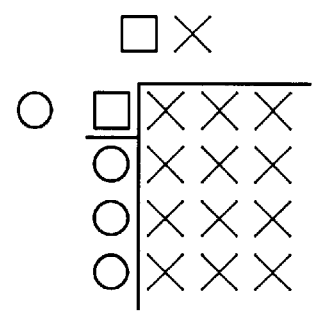

Next, as shown in FIG. 9F, at the time 17, the sequence of pixel data 81, the sequence of pixel data 83 and the sequence of pixel data 82 are supplied to the Rh1 reference block pixel data bus 303, the Rh2 reference block pixel data bus 304, and the Rv1 reference block pixel data bus 301, respectively. The selectors 2211 to 2214 are controlled in response to control signals from the control circuit 10-1 such that the pixel data $R_{5,4}$ is transferred to the Rv reference data buses 207-1 to 207-4. The selectors 2221 to 2224 are controlled in response to control signals from the control circuit 10-1 such that the pixel data $S_{1,1}$ is transferred to the reference data bus 206-1 and the pixel data $R_{1,5}$ is transferred to the reference data buses 206-2 to 206-4. Also, the selectors 23 corresponding to the processing elements $PE_{2,1}$ to $PE_{4,2}$, $PE_{2,2}$ to $PE_{4,2}$, $PE_{2,3}$ to $PE_{4,3}$ and $PE_{2,4}$ to $PE_{4,4}$ are controlled by the control circuit 10-1 such that the pixel data $R_{5,4}$ is supplied to the processing elements $PE_{2,1}$ to $PE_{4,1}$, $PE_{2,2}$ to $PE_{4,2}$, $PE_{2,3}$ to $PE_{4,3}$ and $PE_{2,4}$ to $PE_{4,4}$. The selectors 23 corresponding to the processing element $PE_{1,1}$ is controlled by the control circuit 10-1 such that the pixel data $S_{1,1}$ is supplied to the processing element $PE_{1,1}$ and the selectors 23 corresponding to the processing elements $PE_{1,2}$ to $PE_{1,4}$ are controlled by the control circuit 10-1 such that the pixel data $R_{1,5}$ is supplied to the processing elements $PE_{1,2}$ to $PE_{1,4}$.

Figure 10:
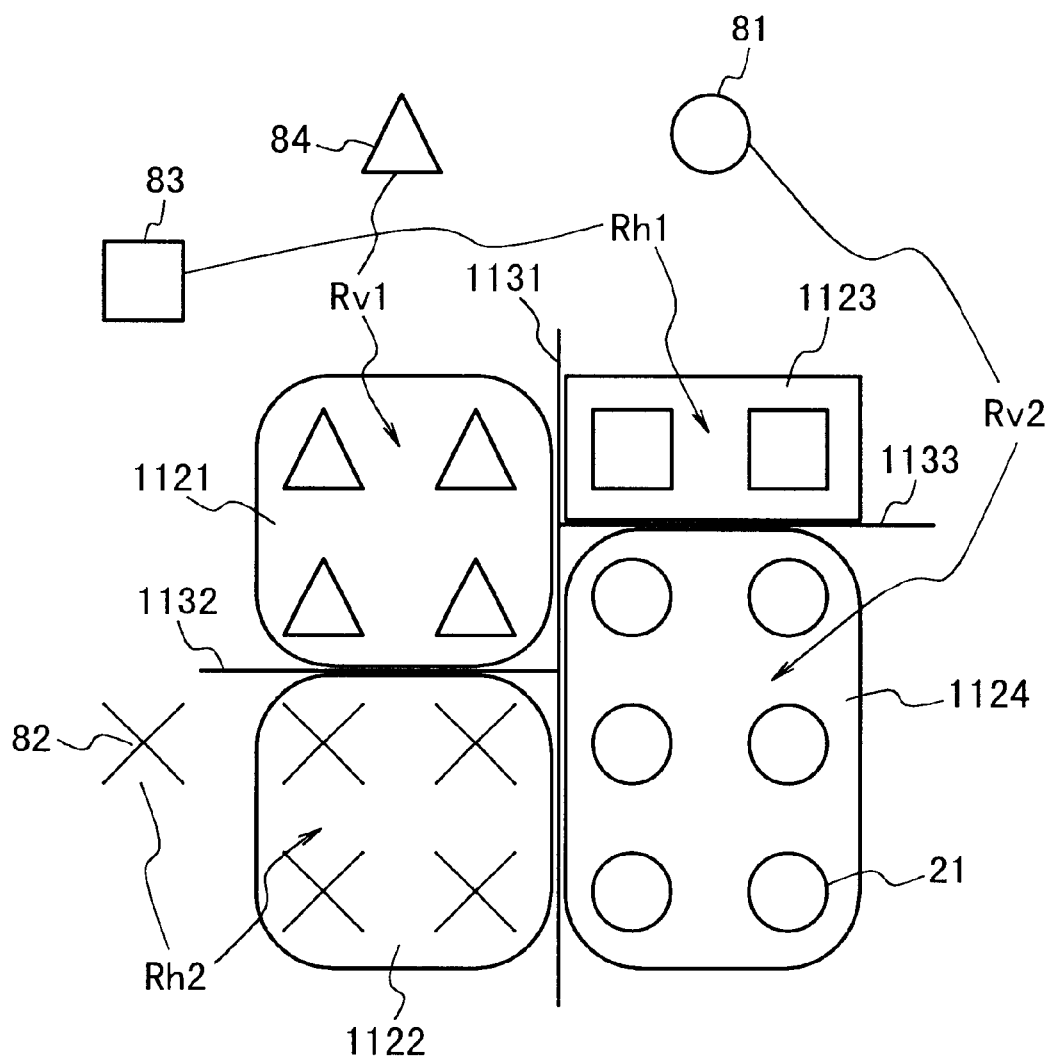
FIG. 10 are schematic diagrams for explaining the supply and selection of a reference block image data in the first embodiment of the present invention.

FIG. 10 is a diagram illustrating a method for supplying the pixel data to the processing elements when four kinds of pixel data are supplied to the processing elements at a time. As shown in FIG. 10, the processing elements are divided into four regions 1121, 1122, 1123 and 1124 by boundary lines 1131, 1132 and 1133.

The example shown in FIG. 10 corresponds to the state of the time 22 in FIGS. 8A and 8B. In this case, the supply of the pixel data from 4 reference block pixel data buses 301 to 304 to 4 regions 1121 to 1124 in FIG. 10 are controlled by moving the boundary lines 1131 to 1133. That is, the selectors 2211 and 2212 are controlled by the control circuit 10-1 such that the sequence of pixel data 84 can be supplied to the Rv reference data buses 207-1 and 207-2. The selectors 2213 and 2214 are controlled by the control circuit 10-1 such that the sequence of pixel data 81 can be supplied to the Rv reference data buses 207-3 and 207-4. The selectors 2221 and 2222 are controlled by the control circuit 10-1 such that the sequence of pixel data 83 can be supplied to the Rh reference data buses 206-1 and 206-2. The selectors 2223 and 2224 are controlled by the control circuit 10-1 such that the sequence of pixel data 82 can be supplied to the Rh reference data buses 206-3 and 206-4. If the selectors 23 corresponding to the processing elements $PE_{1,1}$ to $PE_{4,4}$ are controlled, the four kinds of sequences of pixel data can be supplied to the processing elements $PE_{1,1}$ to $PE_{4,4}$ as shown in FIG. 10. That is, in the block matching unit 3 according to the first embodiment of the present invention, the four kinds of pixel data can be supplied to the processing elements at the same time by properly moving boundary lines 1131 to 1133.

In this manner, since 4 kinds of pixel data over the reference regions in maximum and also one kind of pixel data of the current block can be supplied, the operation rate of the processing elements can be increased to 100%.

Also, even when the block matching process is carried out to a plurality of reference regions, the block matching process can be successively executed while changing the reference regions, in the state in which the operation rate of the processing elements are maintained at 100%. As a result, in this embodiment, the time period required for executing the block matching process can be shortened. When it is supposed that the time period for executing the block matching process is a predetermined constant value, the operation frequency of a clock signal for the block matching unit 3 can be reduced, as compared with that of the conventional system. As a consequence, the power consumption of the block matching circuit can be reduced.

Also, since the time period for performing the necessary block matching process can be shortened, the block matching process can be carried out in the wider reference region.

According to the present invention, the pixel data of the reference region is supplied via a hierarchical selector structure, i.e., the two stages of selectors to the bus wiring line connected to the processing elements as the minimum units of the block matching circuit 300-1. As a consequence, even when the block matching process is carried out to the plurality of reference regions 1101 to 1104, it is possible to execute the block matching process in such a manner that the pipelines of the block matching circuit 300-1 are continuously filled without a wasted processing time. That is, the parallel degree of the block matching process is not decreased. As a consequence, even when the search window is divided into the plurality of reference regions, the processing time of the block matching process is not increased and the power consumption is not increased.

Also, the local wiring lines 203 and 204 in FIG. 4 are employed in the wiring line system used to connect the processing elements as the minimum units of the block matching circuit 300-1. Therefore, when the minimum value or likelihood is calculated from the summation of the difference absolute values, the total number of the wiring lines from all the processing elements to the minimum value detecting circuit 25 can be suppressed. As a consequence, the motion vector estimating apparatus can be realized with the smaller chip area and with power consumption reduced.

Figure 11:
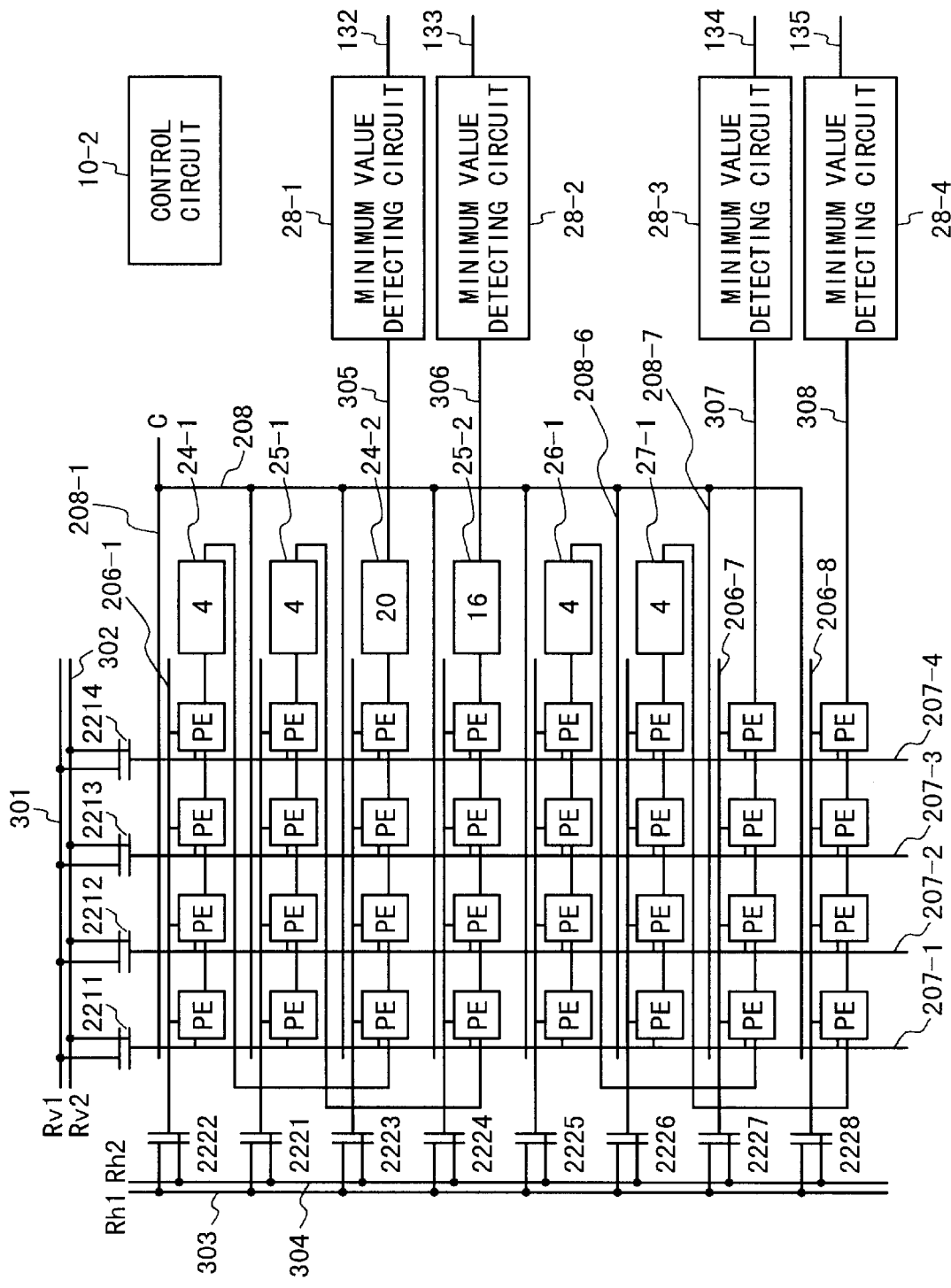
FIG. 11 is a block diagram for explaining a block matching circuit in a second embodiment of the present invention.

Next, the motion vector estimating apparatus according to the second embodiment of the present invention will be described below. FIG. 11 shows the structure of the block matching unit 3 of the motion vector estimating apparatus in the second embodiment.

Referring to FIG. 11, the block matching unit 3 is composed of a control circuit 10-2 like the control circuit 10-1 in the first embodiment, and a block matching circuit 300-1.

The block matching circuit 300-2 includes processing elements $PE_{1,1}$ to $PE_{M,N}$ of M columns and N rows (M and N are positive even integers, respectively), each of which is the same as the processing element in the first embodiment. In this embodiment, M is 4 and N is 8. The current block is composed of (M×N) pixels, i.e., 4×8 in this example. The processing elements are cascade-connected via the output port and the input port in units of rows. The first row is connected to the third row via a FIFO unit 24-1 in cascade connection manner. A minimum value detecting circuit 28-1 is connected to the last stage of processing element $PE_{4,3}$ via a FIFO unit 24-2. The second row is connected to the fourth row via a FIFO unit 25-1 in cascade connection manner. A minimum value detecting circuit 28-2 is connected to the last stage of processing element $PE_{4,4}$ via a FIFO unit 25-2. Also, the fifth row is connected to the seventh row via a FIFO unit 26-1 in cascade connection manner. A minimum value detecting circuit 28-3 is directly connected to the last stage of processing element $PE_{4,7}$. The sixth row is connected to the eighth row via a FIFO unit 27-1 in cascade connection manner. A minimum value detecting circuit 28-4 is directly connected to the last stage of processing element $PE_{4,8}$.

In other words, as shown in FIG. 11, in the processing elements of the odd rows in an upper half of block matching circuit 300-2, the input and output ports 203 and 204 are cascade-connected via the FIFO units 24-1 and 24-2. In the processing elements of the even rows in the upper half of the block matching circuit 300-2, the input and output ports 203 and 204 are cascade-connected via the FIFO units 25-1 and 25-2. In the processing elements of the odd rows in the lower half of the block matching circuit 300-2, the input and output ports 203 and 204 are cascade-connected via the FIFO unit 26-1. In the processing elements of the even rows in the lower half of the block matching circuit 300-2, the input and output ports 203 and 204 are cascade-connected via the FIFO unit 27-1.

The stage numbers of the FIFO units 24-1, 25-1, 24-2, 25-2, 26-1 and 27-1 are 4, 4, 20, 16, 4 and 4, respectively, as shown in FIG. 11.

Rh reference data buses 206-1 to 206-8 are provided for the rows, respectively, and Rv reference data buses 207-1 to 207-4 are provided for the columns, respectively. The relation of one of the processing elements and the corresponding Rh and Rv reference data buses is the same as in the first embodiment.

The RV reference block pixel data buses 301 and 302 are provided and one of them is connected to the Rv reference data buses 207-1 to 207-4 via selectors 2211 to 2214, respectively. The Rh reference block pixel data buses 303 and 304 are provided and one of them is connected to the Rh reference data buses 206-1 to 206-8 via selectors 2221 to 2228, respectively.

The current data buses 208-1 to 208-8 are provided for the rows, respectively, and are connected together. It should be noted that although the current data buses 208-1 to 208-8 are commonly connected in the structural example shown in FIG. 11, these current data buses 208-1 to 208-8 are not always commonly connected.

One of pixel data of four sequences on the Rv and Rh reference block pixel data buses 301 to 304 is supplied to one processing element via one of the selectors 2211 to 2214 and one of the selectors 2221 to 2228, and then the selector 23 corresponding to the processing element, as in the first embodiment.

In FIG. 11, if the total number of processing elements is set equal to the number of pixels, M×N, of the current block, the stage number in each of the FIFO units can be decreased. As a result, the chip area of the block matching circuit 300-2 can be further reduced, and also the power consumption can be reduced.

Also, in FIG. 11, it is assumed that the number of stages of each of the FIFO units 24-1, 25-1, 26-1, 27-1 is selected to be M, that the number of stages of the FIFO unit 24-2 is selected to be (M×N)/2+M, and that the number of stage of the FIFO unit 25-2 is selected to be (M×N)/2. In this case, a summation of an output 305 from the FIFO unit 24-2, an output 306 from the FIFO unit 25-2, an output 307 from the processing element $PE_{M,N-1}$, and an output 308 from the processing element $PE_{M,N}$ can be equal to the output 310 shown in FIG. 2. Further, according to the second embodiment of the present invention, the data entry from the reference regions is scheduled in such a manner that the number of stage of each of the FIFO units can be simultaneously reduced. As a consequence, the block matching circuit can be realized such that the chip area can be saved and the power consumption can be reduced.

In the case that the present invention is applied to the MPEG-2 (ISO/IEC 13818-2), if the circuit structure shown in FIG. 11 is employed, there can be obtained at the same time the data which are required in a frame motion compensating prediction of the motion compensating prediction in a frame structure, a field motion compensating prediction, a field motion compensating prediction of the motion compensating perdition in the field structure, and the 16×8 motion compensating prediction. In addition, the processing elements are divided into four kinds of processing elements as the respective processing elements belonging to the upper odd rows, the upper even rows, the lower odd rows, and the lower even rows. Therefore, the motion vectors can be simultaneously acquired in response to a plurality of prediction modes of MPEG-2 (ISO/IEC 13818-2). In this case, there are only the local wiring lines among the wiring lines connected from the processing elements, and the chip area can be reduced.

Figure 12:
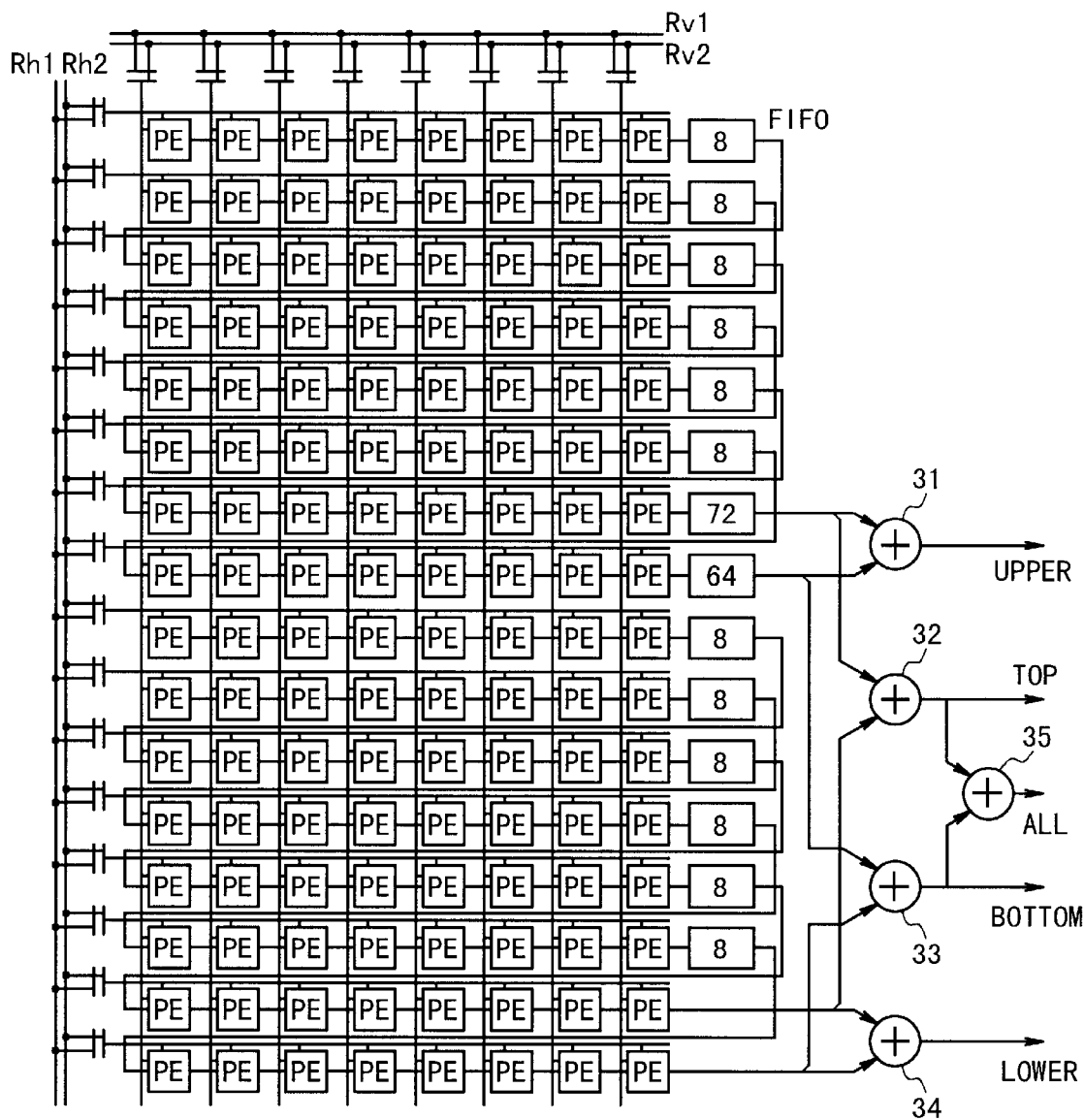
FIG. 12 is a block diagram for explaining a block matching circuit in a third embodiment of the present invention.

Next, the motion vector estimating apparatus according to the third embodiment of the present invention will be described below. FIG. 12 shows the structure of a block matching circuit 300-3 in the third embodiment. The block matching circuit 300-3 includes processing elements of 8 columns and 16 rows. The structural concept of the block matching circuit shown in FIG. 12 is the same as that of the block matching circuit in the second embodiment. The difference point is in the number of processing elements.

Like in the second embodiment, in the processing elements of the odd rows in an upper half of block matching circuit 300-3, the input and output ports 203 and 204 are cascade-connected via three FIFO units. In the processing elements of the even rows in the upper half of the block matching circuit 300-3, the input and output ports 203 and 204 are cascade-connected via three FIFO units. In the processing elements of the odd rows in the lower half of the block matching circuit 300-3, the input and output ports 203 and 204 are cascade-connected via three FIFO units. In the processing elements of the even rows in the lower half of the block matching circuit 300-3, the input and output ports 203 and 204 are cascade-connected via three FIFO units. Each of the above-mentioned FIFO units has the stages of 8.

The last stage of processing element of the odd rows in the upper half is connected to adders 31 and 32 via a FIFO unit having the stages of 72. The last stage of processing element of the even rows in the upper half is connected to the adder 31 and an adder 33 via a FIFO unit having the stages of 64. The last stage of processing element of the odd rows in the lower half is directly connected to the adder 32 and an adder 34. The last stage of processing element of the even rows in the lower half is directly connected to the adders 33 and 34. The outputs of the adders 32 and 33 are connected to an adder 35.

In this embodiment, in spite of decreasing the number of stages in each FIFO unit, three matching criteria needed for MPEG2, i.e., 16×16, 16×8 (top) and 16×8 (bottom) for the frame structure can be obtained at the same time. Also, three matching criteria, i.e., 16×16, 16×8 (upper) and 16×8 (lower) for the field structure can be obtained at the same time.

Figure 13:
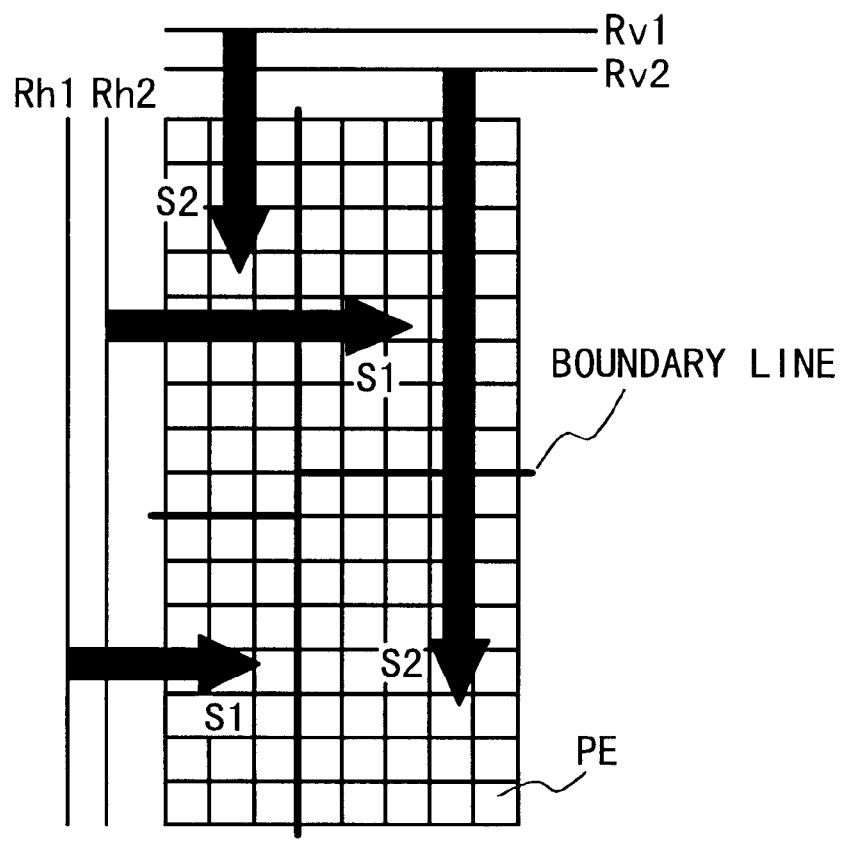
FIG. 13 is a diagram for explaining the supply and selection of a reference block image data in the third embodiment of the present invention shown in FIG. 12.

FIG. 13 is a diagram to explain the supply of the reference block pixel data. The reference block pixel data are supplied from four reference block pixel data buses while changing the boundary lines, as in the first embodiment. Therefore, the detail description is omitted.

Next, the motion vector estimating apparatus according to the fourth embodiment of the present invention will be described below. The basic structure of the motion vector estimating apparatus in the fourth embodiment is the same as that of the first embodiment. Therefore, the different point will be described.

Figure 14:
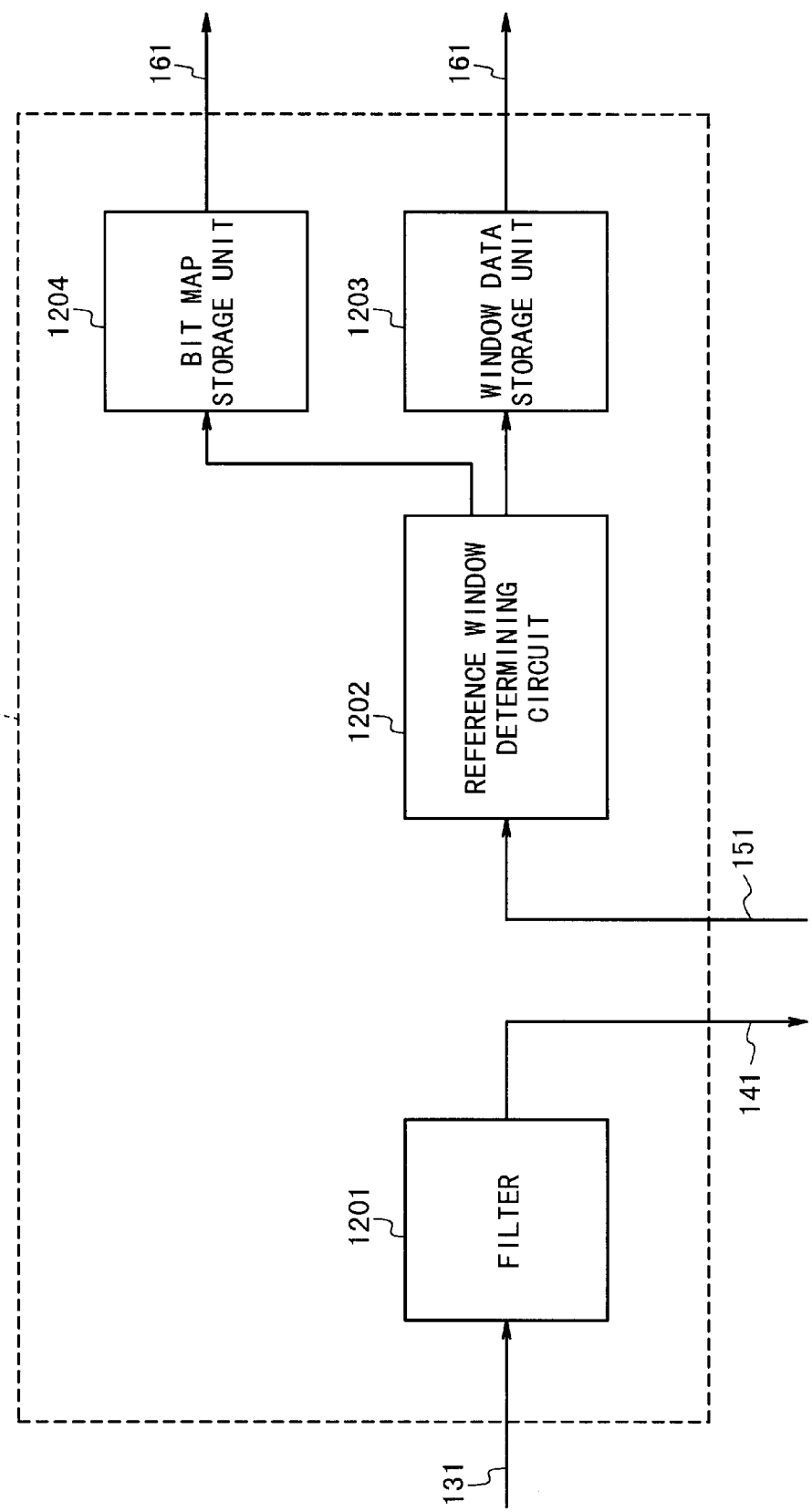
FIG. 14 is a diagram illustrating the structure of the motion vector monitoring unit in a fourth embodiment of the present invention.

FIG. 14 shows the structure of the motion vector monitoring unit 4' of the motion vector estimating apparatus in the fourth embodiment. Referring now to FIG. 14, the motion vector monitoring unit 4' is composed of the filter 1201 for filtering the motion vectors obtained from the block matching unit 3, the search window determining circuit 1202, the window data storage unit 1203, and a bit map storage unit 1204. The filter 1201 and the window data storage unit 1203 are the same as those in the first embodiment.

Figure 15:
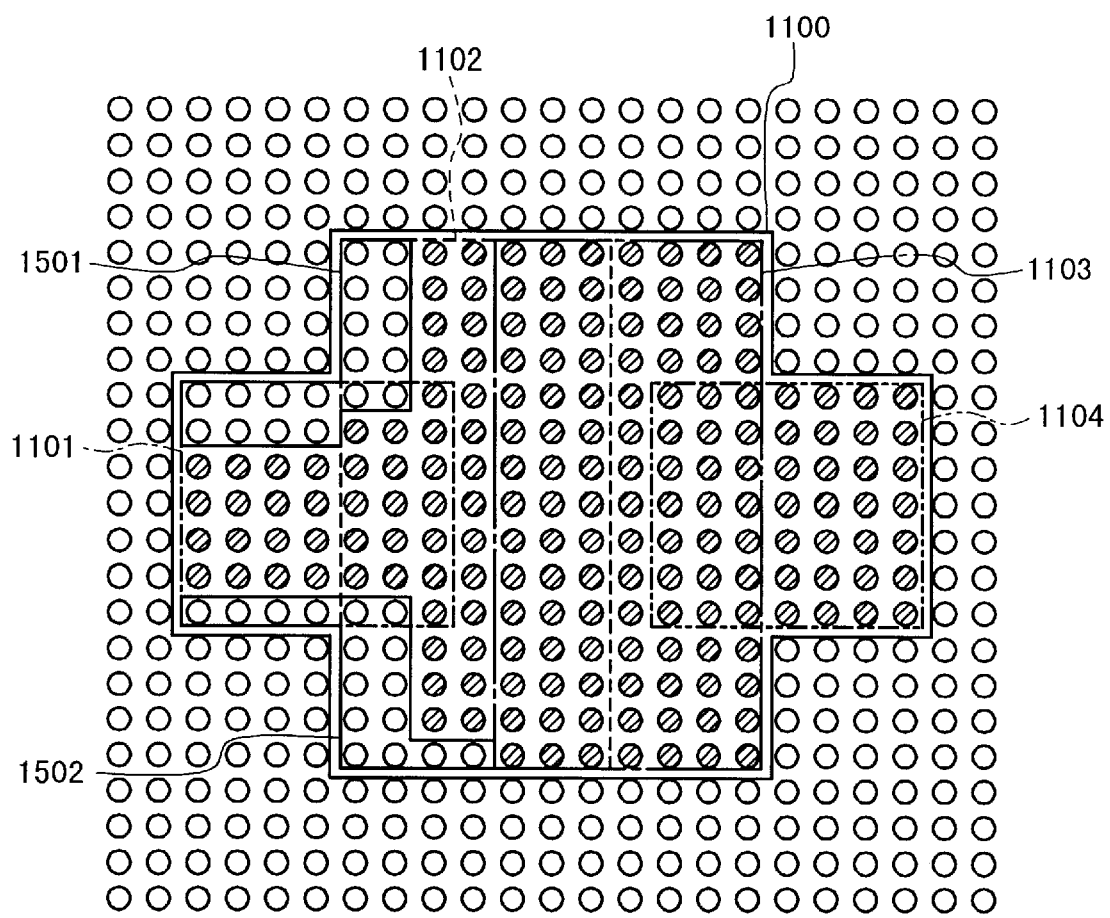
FIG. 15 is a diagram to explain the operation of the motion vector monitoring unit in the fourth embodiment shown in FIG. 14.

The search window determining circuit 1202 determines estimation history of previously estimated motion vectors obtained from the motion vector storage unit 5, determine a search window from the estimation history and stores pointers designating this determined search window into the window data storage unit 1203. Also, the search window determining circuit 1202 determines bit-map regions 1501 and 1502 as shown in FIG. 15, and then stores this bit-map regions 1501 and 1502 in the bit map storage unit 1204. It should be noted that the filter 1201 is provided, if necessary. Each of the above-described pointers are composed of, for instance, an upper left position of each of the rectangular reference regions of the search window, a height of each reference region, a width of each reference region, and so on.

With reference to FIG. 6A, the reference regions 1101 to 1104 which form the search window 1100 can be represented to have a rectangular shapes. To the contrary, each of the bit-map regions 1501 and 1502 can be defined in units of pixels by free curved lines, as shown by white circles in FIG. 15. In this case, a 1-bit flag data can be added to each of the pixel data of the reference regions 1101 to 1104 within the search window to be supplied into the block matching unit 3. The 1-bit flag data indicates whether the pixel data is valid or invalid.

Figure 16:
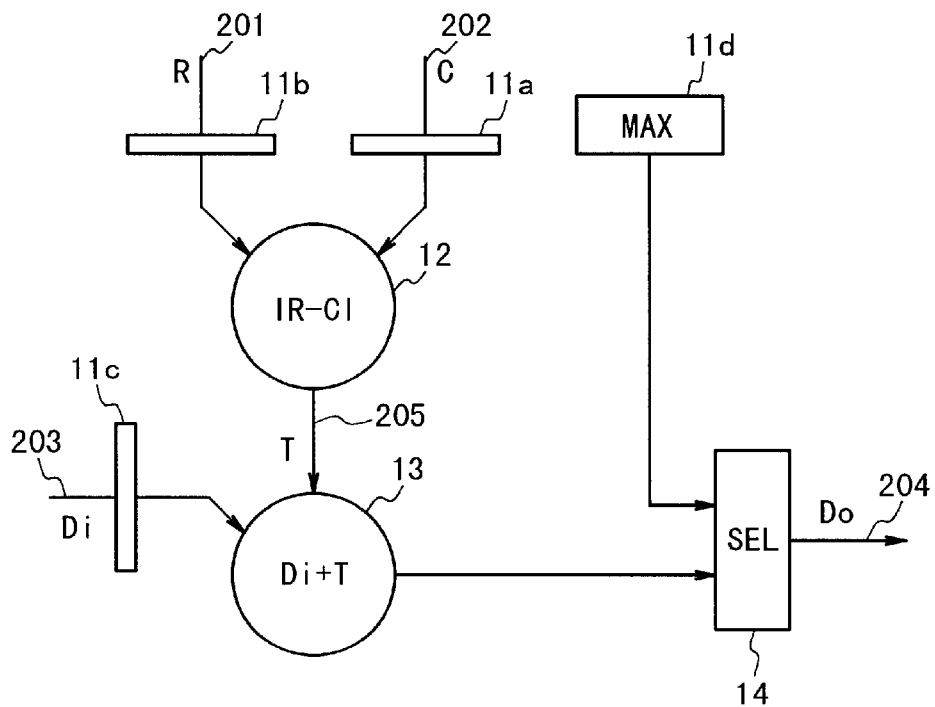
FIG. 16 is a block diagram illustrating the internal structure of a processing element of the block matching circuit in the fourth embodiment.

FIG. 16 is a block diagram illustrating the structure of the processing element. The processing element of the block matching circuit in the fourth embodiment has a register lid for fixedly holding a maximum value, and a selector 14 for selecting one of the output from the register 11d and the output from the adding element 13 in response to a control signal from the control circuit 10-1.

When a pixel data is supplied to the block matching unit 3, the control circuit 10-1 checks the flag data of the pixel data. When the flag data indicates that the pixel data is contained in the bit map region 1501 or 1502 shown in FIG. 15 and is invalid, the control circuit 10-1 outputs the control signal to the processing element for the invalid pixel data to be supplied such that the content of the register lid is outputted from the output port Do via the selector 14. As a result, the reference block containing the invalid pixel data of the bit map regions is excluded from a region where any motion vector is to be detected. In this case, the pixel data may be not read out from the reference picture data storage unit 2. Therefore, the calculations of the absolute value of difference and addition may be not performed in the processing element. Thus, the power consumption can be reduced.

There are cases that the reference regions are limited in the vicinity of the right end, the left end, the upper end, and the lower end. Even when the limited reference regions are present, the flag data is added to the pixel data in the reference regions of the search window regions, and the block matching process is selectively performed based on the flag data of each pixel data. Therefore, in this case, the structure of the block matching circuit 3 is not made complex. As described above, even when the data width of the reference region is increased by 1-bit at most, there is no need to change the structure of the block matching unit 3.

In a motion vector estimating apparatus according to the fourth embodiment of the present invention, the block matching process is carried out between a certain current block and a reference block within the search window to detect a motion vector. The block matching circuit in the fourth embodiment is structured in a similar manner to FIG. 2, 11 or 12. Also, each of the pixel data having the valid flag is supplied in a similar manner to FIGS. 8A and 8B.

In the embodiment of the present invention, as described above, since the search window can be freely determined, the useless calculations performed in the processing elements, and the useless data reading operation from the reference picture data storage unit 2 are decreased. As a result, the power consumption can be lowered.

Figure 17:
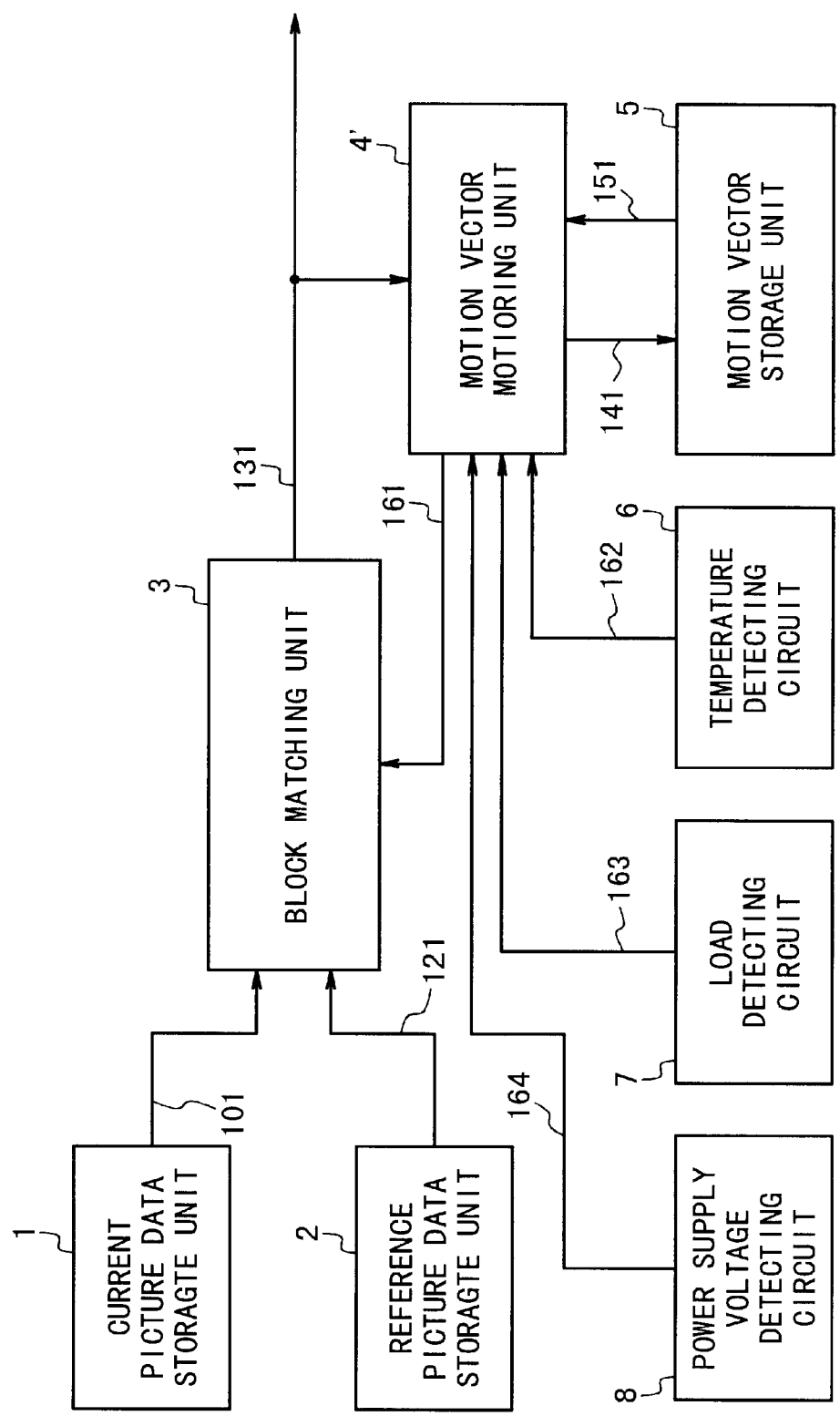
FIG. 17 is a block diagram illustrating the structure of the motion vector estimating apparatus according to a fifth embodiment of the present invention.

FIG. 17 is a block diagram illustrating the structure of the motion vector estimating apparatus according to the fifth embodiment of the present invention. Referring now to FIG. 17, the motion vector estimating apparatus in the fifth embodiment is composed of a temperature detecting unit 6, a load detecting circuit 7, and a power supply voltage detecting circuit 8, in addition to the structure shown in FIG. 1. In this embodiment, the motion vector monitoring unit 4' has the bit map storage unit 1204, like the fourth embodiment.

As described in the first embodiment, the block matching circuit is realized on a semiconductor chip. The temperature detecting circuit 6 detects a temperature of the chip on which the block matching unit 3 is formed. Then, the temperature detecting circuit 6 generates a search window restriction data based on the detecting result to supply to the motion vector monitoring unit 4'.

The load detecting circuit 7 detects a system load of the block matching unit 3 such as the number of times of the block matching process or an amount of data to be supplied to the block matching unit 3. Then, the load detecting circuit 7 generates a search window restriction data based on the detecting result to supply to the motion vector monitoring unit 4'.

The power supply voltage detecting circuit 8 detects the power supply voltage of the motion vector estimating apparatus and generates a search window restriction data based on the detecting result to supply to the motion vector monitoring unit 4'.

In this manner, the motion vector monitoring unit 4' determines the search window based on not only the motion vector estimation history but also at least one of the temperature, the system load and the power supply voltage. For example, when the detected temperature is higher than a reference temperature, when the detected system load is heavier than a reference load, or when the power supply voltage is lower than a reference voltage, the search window may be determined to have a smaller size in addition to change of the shape and position.

In this manner, the shape, size and position of the search window can be adaptively determined based on the estimation history of the previous motion vectors and the detected temperature, load or voltage. Then, the block matching process is carried out between the current block and each of the reference blocks within the search window to detect a motion vector.

Also, in the present invention, the size, shape and position of the search window may be adaptively determined based on system load such as the load of the block matching unit 3, the chip temperature of the block matching unit 3, or the power supply voltage. In this case, when the system load is heavy, this implies that the process required for the entire system as the motion vector process is large. Therefore, the size, shape or position of the search window is changed.

Since the size, shape, or position of the search window is adaptively determined based on the above-described system load, no excessive system load is given to the processing capability of the motion vector estimating apparatus. In other words, for instance, when the chip temperature is increased, the search window is made narrower. In this case, since the search window becomes narrower, the calculation amount by the block matching unit 3 is restricted and heat dissipation of the LSI chip is restricted. Similarly, when the power supply voltage from a power source such as a cell used to drive the motion vector estimating apparatus is decreased, the search window may be conceivably narrowed in accordance with the detected power supply voltage. Thus, in a portable terminal equipment by using a cell, the operation time thereof can be extended.

In the present invention, a motion vector of a frame previous to the current frame by 1, a motion vector of a field previous to the current field by 1, a motion vector of the same frame as that of the current reference region, and a motion vector of the same filed as that of the current reference region may be employed as the estimation history of the previously estimated motion vectors.

Also, while utilizing features of pixel data of a reference region, for example, image data related to sports and image data related to movies may be referred to for determining the estimation history of motion vectors.

In the conventional motion vector estimating method, while the same position as the current block within either the frame or the field is used as the center, the reference region is determined.

On the other hand, in the embodiments of the present invention, the position of the search window may be adaptively varied based on the above-described estimation history of motion vectors. That is to say, referring to the estimation history of the motion vectors, when the average value of this motion vectors is directed to a predetermined direction, the center position of the search window can be moved to this direction. In this case, although the search window is made narrower, it is possible to detect the correct motion vector.

Also, similar to the estimation history of motion vectors, either the shape or size of the search window may be conceivably changed with reference to the load of the motion vector estimating apparatus, the power supply voltage and the chip temperature. In other words, for instance, while monitoring a temperature of an LSI chip on which the motion vector estimating apparatus is mounted, when this temperature is increased, the reference region is made narrower. In this case, since the search window becomes narrower, the calculation amount by the LSI may suppress heat dissipation of the LSI.

Similarly, while monitoring a remaining power amount of a power source such as a cell used to drive the motion vector estimating apparatus, the search window may be conceivably narrowed in accordance with this remaining power amount. In this case, for instance, in a portable terminal by using the cell, the operation time thereof can be extended.

Furthermore, in the embodiment of the present invention, the search window determining circuit 1202 may be realized by a microprocessor or the like. As a consequence, the search window determining circuit 1202 may be mounted on another LSI. This is because the changing operation of the shape, size and/or position of the search window may be once carried out within 1 frame, 1 field, or a certain time period. Therefore, the process time required for determining the search window does not impede the overall operation. In this case, since the algorithm for determining the search window can be programmed, the search window can be more flexibly determined. For example, in the case that certain image data is changed from the sports image into the movie image, this image change is determined by a human operator, so that the search window may be changed.

As described above, according to the present invention, the below-mentioned effects can be achieved.

First, in the present invention, the motion vector can be detected in high precision under low power consumption. This is because the dimension, shape and/or position of the search window can be adaptively determined based on previously estimated motion vectors. Also, the dimension, shape and/or position of the search window can be adaptively determined based on the load of the motion vector estimating apparatus such as temperature of the motion vector estimating apparatus, the power supply voltage and the number of time of block matching process.

Second, in the present invention, when the block matching process is performed in the parallel manner, this parallel degree is not decreased. As a result, according to the present invention, the block matching process can be performed within a short time, and the power consumption can be reduced. Also, according to the present invention, even when the search window is made small, the motion vector can be detected in high precision. This is because the search window can be flexibly determined and divided into a plurality of reference regions. Also, it is because the data supply schedule is devised.

Third, in the present invention, the chip area for the block matching circuit can be saved and the power consumption can be reduced. This is because the number of buses required to enter the reference block pixel data is small. Also, it is because the entry of the reference block pixel data is scheduled in such a manner that the number of stage in the FIFO units can be reduced.

Fourth, in the present invention, even when the block matching process is carried out over a plurality of reference regions, it is possible to execute the block matching process such that the pipeline of the block matching circuit is always filled. That is, the parallel degree of the process is not decreased. As a consequence, in accordance with the present invention, even when the reference region is subdivided into the plural reference regions, there is no risk that the process is increased and the power consumption is increased.

This is because the reference block pixel data of the search window is supplied via the two stage of selectors to the bus wiring line connected to the processing elements.

Fifth, in the present invention, when the minimum value or likelihood is calculated from the summation of the difference absolute values, increasing in the total number of the wiring lines from all the processing elements to the minimum value detecting circuit can be suppressed. As a consequence, according to the present invention, the motion vector estimating apparatus can be realized with the smaller chip area and with reduced power consumption. This is because the local wiring lines are employed in the wiring lines used to connect the processing elements.

Sixth, in the present invention, the motion vectors can be simultaneously acquired in response to a plurality of prediction modes of MPEG-2 (ISO/IEC 13818-2). In this case, according to the present invention, there are only the local wiring lines among the wiring lines connected from the processing elements, and the chip area can be reduced. This is because the processing elements are divided into four sorts of processing elements as the respective processing elements belonging to the even row, the odd row, the upper half row, and the lower half row.

What is claimed is:

1. A motion vector estimating apparatus comprising:
 a current picture storage unit which stores image data of a current picture;

a reference picture storage unit which stores image data of a reference picture;

a search window determining unit which determines estimation history from previously estimated motion vectors obtained from a plurality of prior blocks of the current picture received by the current picture storage unit previous in time to the receiving of a current block of the current picture, and determines a search window based on said estimation history wherein said search window is composed of rectangular reference regions;

a block matching circuit for performing a block matching process to the current block and each of reference blocks of said search window to determine a motion vector; and a control circuit which reads out the image data of said current block from said current picture storage unit to supply said block matching circuit, which reads out the image data of each of said reference blocks of said search window from said reference picture storage unit to supply to said block matching circuit, and which controls said block matching circuit such that said block matching process is performed to said current block and said each reference block of said search window, wherein said search window determining unit determines whether a number of previously estimated motion vectors exceeds a predetermined number, and neglects the previously estimated motion vectors to determine said size and shape of said search window, when it is determined that the number of previously estimated motion vectors is less than the predetermined number but greater than zero.

2. A motion vector estimating apparatus comprising:

a current picture storage unit which stores image data of a current picture;

a reference picture storage unit which stores image data of a reference picture, a search window determining unit which determines estimation history from previously estimated motion, and determines a search window based on said estimation history, wherein said search window is composed of rectangular reference regions;

a block matching circuit for performing a block matching process to a current block and each of reference blocks of said search window to determine a motion vector: and a control circuit which reads out the image data of said current block from said current picture storage unit to supply said block matching circuit, which reads out the image data of each of said reference blocks of said search window from said reference picture storage unit to supply to said block matching circuit, and which controls said block matching circuit such that said block matching process is performed to said current block and said each reference block of said search window, wherein said block matching circuit includes processing elements of M columns and N rows (M and N are positive integers) provided such that a likelihood between said current block and each of said reference blocks is calculated through pipeline processing, wherein said current block is composed of M columns and N rows, and wherein said processing elements are cascade-connected in each of said N rows (N is an even number), wherein odd-numbered ones of said N rows in an upper half are cascade-connected via first FIFO units, each of which is provided for two adjacent odd-numbered rows, wherein even-numbered ones of said N rows in said upper half are cascade-connected via second FIFO units, each of which is provided for two adjacent even-numbered rows, wherein odd-numbered ones of said N rows in a lower half are cascade-connected via third FIFO units, each of which is provided for two adjacent odd-numbered rows, and wherein even-numbered ones of said N rows in said lower half are cascade-connected via fourth FIFO units, each of which is provided for two adjacent odd-numbered rows, and wherein said block matching circuit further includes fifth and sixth FIFO units connected to last stages of processing elements in said cascade connections for the odd-numbered rows and the even-numbered rows in said upper half, respectively.

3. A motion vector estimating apparatus according to claim 2, wherein a number of stages in each of said first to fourth FIFO units is M, and a number of stages in said fifth FIFO unit is (M×N/2+M), and a number of stages in said sixth FIFO unit is (M×N/2).

4. A method of estimating a motion vector, comprising the steps of:

determining estimation history from previously estimated motion vectors:

determining a search window based on said estimation history, wherein said search window is composed of rectangular reference regions; and performing a block matching process to a current block and each of reference blocks of said search window to determine a motion vector, wherein said step of performing a block matching process includes performing said block matching process in a pipeline processing using processing elements of M columns and N rows (M and N are positive integers)

wherein said step of performing said block matching process in a pipeline processing includes:
  in each of said processing elements, calculating an absolute value of a difference between a corresponding pixel data of said current block and one pixel data of each of said reference blocks;
  adding the absolute value to an output from a previous stage of processing element; and
  outputting the adding result to a next stage of said processing element, wherein said step of performing said block matching process in a pipeline processing includes, in each of said processing elements, performing the calculation of the absolute value of the difference and the addition and to output the addition to the next stage of processing element in synchronous with a clock signal, and wherein said step of performing said block matching process in a pipeline processing includes:
  calculating a likelihood of one of said reference blocks in a time period from a first time to (M×N) time; and
  calculating a likelihood of a different one of said reference blocks in a time period from a second time to (M×N+1) time.

* * * * *